(12) United States Patent
Pottjegort

(10) Patent No.: US 9,865,005 B1
(45) Date of Patent: Jan. 9, 2018

(54) UNIFIED CONTENT VISIBILITY AND VIDEO CONTENT MONITORING

(71) Applicant: COMSCORE, INC., Reston, VA (US)

(72) Inventor: Thomas F. Pottjegort, Ashburn, VA (US)

(73) Assignee: comScore, Inc., Reston, VA (US)

( * ) Notice: Subject to any disclaimer, the term of this patent is extended or adjusted under 35 U.S.C. 154(b) by 0 days.

(21) Appl. No.: 14/212,363

(22) Filed: Mar. 14, 2014

Related U.S. Application Data

(63) Continuation-in-part of application No. 13/352,134, filed on Jan. 17, 2012.

(60) Provisional application No. 61/794,709, filed on Mar. 15, 2013.

(51) Int. Cl.
*G06Q 30/00* (2012.01)
*G06Q 30/02* (2012.01)

(52) U.S. Cl.
CPC ................ *G06Q 30/0246* (2013.01)

(58) Field of Classification Search
USPC .......................................................... 463/31
See application file for complete search history.

(56) References Cited

U.S. PATENT DOCUMENTS

| | | | |
|---|---|---|---|
| 6,064,376 A | 5/2000 | Berezowski et al. | |
| 6,108,637 A | 8/2000 | Blumenau | |
| 7,386,473 B2 | 6/2008 | Blumenau | |
| 7,590,568 B2 | 9/2009 | Blumenau | |
| 7,613,635 B2 | 11/2009 | Blumenau | |
| 7,644,156 B2 | 1/2010 | Blumenau | |
| 7,650,407 B2 | 1/2010 | Blumenau | |
| 7,653,724 B2 | 1/2010 | Blumenau | |
| 7,716,326 B2 | 5/2010 | Blumenau | |
| 7,720,963 B2 | 5/2010 | Blumenau | |
| 7,720,964 B2 | 5/2010 | Blumenau | |
| 7,756,974 B2 | 7/2010 | Blumenau | |

(Continued)

FOREIGN PATENT DOCUMENTS

| | | |
|---|---|---|
| WO | 1998010349 A2 | 3/1998 |
| WO | 2011075886 A1 | 6/2011 |

OTHER PUBLICATIONS

Tinic Uro, "Timing it right", kaourantin.net: Timing it right, Mar. 1, 2010, pp. 1-11, http://www.kaourantin.net/2010/01/timing-it-right.html.

(Continued)

*Primary Examiner* — Afaf Ahmed Osman Bilal Ahme
(74) *Attorney, Agent, or Firm* — Baker & Hostetler LLP

(57) ABSTRACT

Techniques for measuring the visibility of video content are presented. The video content, such as a video advertisement, may be played or presented by a video player, for example as part of a web page. Initialization code may be incorporated within a video player. The initialization code may examine metadata associated with video content to determine whether to measure visibility information associated with the video content. If a measurement flag is encountered in the metadata, the initialization code may initialize measurement code designed to measure visibility information associated with the video content. The measurement code may execute to measure visibility information associated with the video content and transmit the visibility information to a measurement server.

15 Claims, 16 Drawing Sheets

(56) References Cited

U.S. PATENT DOCUMENTS

| | | |
|---|---|---|
| 2004/0015608 A1* | 1/2004 | Ellis ................. G06Q 30/02 |
| | | 709/246 |
| 2007/0106787 A1 | 5/2007 | Blumenau |
| 2007/0106792 A1 | 5/2007 | Blumenau |
| 2008/0102947 A1 | 5/2008 | Hays et al. |
| 2008/0102974 A1* | 5/2008 | Nam et al. ................. 473/300 |
| 2008/0301741 A1 | 12/2008 | Stern et al. |
| 2009/0327869 A1 | 12/2009 | Fan et al. |
| 2010/0088373 A1 | 4/2010 | Pinkham |
| 2010/0235765 A1* | 9/2010 | Worthington ..... G06F 17/30899 |
| | | 715/760 |
| 2010/0299604 A1 | 11/2010 | Blumenau |
| 2011/0035274 A1 | 2/2011 | Goel et al. |
| 2012/0272256 A1 | 10/2012 | Bedi |
| 2012/0311627 A1* | 12/2012 | Cho ................. H04N 21/80 |
| | | 725/32 |
| 2012/0324098 A1* | 12/2012 | De Jager ............. G06Q 30/02 |
| | | 709/224 |
| 2013/0167005 A1* | 6/2013 | Corbett ............ G06F 17/30058 |
| | | 715/234 |
| 2013/0185164 A1 | 7/2013 | Pottjegort |
| 2013/0227393 A1 | 8/2013 | De Jager et al. |

OTHER PUBLICATIONS

Non-Final Office Action dated Nov. 17, 2014, U.S. Appl. No. 13/352,134, filed Jan. 17, 2012, 63 pages.

Final Office Action dated May 5, 2016, U.S. Appl. No. 14/213,308, pp. 1-8.

Non-Final Office Action dated Oct. 8, 2015, U.S. Appl. No. 14/213,308, pp. 1-21.

Non-Final Office Action dated Sep. 22, 2016, U.S. Appl. No. 14/213,308, pp. 1-17.

* cited by examiner

Jim's BMW® SuperSite

The Latest BMW® News and Products

BMW® Bucks Recession Trend in Luxury Vehicles
Friday, October 14, 2011
Posted by: Jim Madison Proving once again that purchasing a BMW® is one of the best vehicle investments you can make, Forbes® has an article out today that contrasts recent BMW® sales for 2011 Q3 with that of other luxury carmakers. Even though luxury car sales declined across the board in Q3, BMW® took the smallest hit with only a 3% reduction over Q2 sales. Acura® came in second with 5%, and Jaguar® followed up the rear with a devastating 12% drop. You can read the full article here.

Comments: 27

The New X5® Is Here!
Thursday, October 13, 2011
Posted by: T. Jefferson (guest blogging)

A little later than expected, to be sure, but here nonetheless. Yours truly had the opportunity to test drive one this morning. Next week, I'll post a full review. But first, check out these pictures I took.

Comments: 51

1-Series
3-Series
5-Series
6-Series
7-Series
News
Reviews

BMW® Service Manuals 30% Off!!!

FOR SALE $7400
Got a car to sell? Get top dollar here!

Meet Local Singles

Injured? Need an Attorney? Free Consultation!

Is Your Identity Safe?
Click here to find out

FIG. 2

800 `<iframe src="http://www.example.org/getAd.php?siteID=867530" width="300" height="300"></iframe>`

810 `<img id="ad_06131953" src="http://www.example.org/ads/ad_06131953.jpg"/>` ~ 812
`<script type="text/javascript"`
`    src="www.example.net/getVisibility_Code.aspx?ad_name=ad_06131953&site_id=867530"/>` ~ 814

820
```
viewed = false;
impression_window = 30000;
t = 0;
while (t <= impression_window) {                    ⎫
    if (ad_06131953.window_draw_count > 0) {        ⎬ 822
        viewed = true;                              
        break;
    } else {
        sleep(100);
        t += 100;
    }
}
reportVisibility (viewed);

function reportVisibility(bool viewed) {
    msg = new XMLHttpRequest();
    if (viewed) {
        url = "www.example.net/visibilityMetrics.aspx?siteID=867530&adID=06131953&visible=true";   824
    } else {
        url = "www.example.net/visibilityMetrics.aspx?siteID=867530&adID=06131953&visible=false";  826
    }
    msg.open("GET", url,false);
    xmlhttp.send();
}
```

Fig. 8

UNIFIED CONTENT VISIBILITY AND VIDEO CONTENT MONITORING

CROSS-REFERENCE TO RELATED APPLICATIONS

This application is a Continuation-in-Part of, and claims the benefit of pending U.S. patent application Ser. No. 13/352,134, filed on 17 Jan. 2012, which is hereby incorporated by reference in its entirety. This application also claims the benefit of U.S. Provisional Application No. 61/794,709 filed on 15 Mar. 2013, which is hereby incorporated by reference in its entirety.

TECHNICAL FIELD

The present disclosure relates generally to methods, systems, and computer-readable media for determining the visibility of advertisements on client devices.

BACKGROUND

Internet audience measurement may be useful for a number of reasons. For example, some organizations may want to be able to make claims about the size and growth of their audiences or technologies. Similarly, understanding consumer behavior, such as how consumers interact with a particular web site, group of web sites or other web resource, may help organizations make decisions that improve their traffic flow or better achieve the objective of their web site or other web resources. In addition, understanding Internet audience visitation patterns and habits may be useful for informing advertising planning, buying, and selling decisions related to web resources.

In the area of online advertising, an advertiser, such as a company that is selling goods or services or a non-profit entity advancing a particular cause, pays a website owner, known as a "publisher," to include the advertiser's advertisements into one or more of the publisher's webpages. An advertiser may have its advertisements displayed through multiple publishers or third party advertising networks/brokers, and a publisher may display advertisements from multiple advertisers or third party advertising networks/brokers on any one of its webpages.

FIG. 1 depicts an example of a publisher webpage 120 that includes a plurality of advertisements 131-133. The advertisements 131-133 may comprise static image content, animated image content, interactive content, video content, textual content, or any other kinds of objects or elements that may be used to market products or services. Typically, rather than hosting advertisements 131-133 directly on its server, the publisher will include links or elements (known as "ad-codes") into the hypertext markup language (HTML) of webpage 120. The ad-codes will instruct users' browsers to retrieve advertisements from ad-servers operated by advertisers or from ad-servers operated by third-party intermediaries, such as advertising networks or brokers. FIG. 1 depicts an exemplary webpage 120 as it might be rendered by a web browser 110 on a client device after having retrieved both the HTML of the webpage from the publisher and advertisements 131-133 from their respective advertisers or third party advertising networks.

In an impression- or view-based advertising compensation model, a publisher may earn a commission from an advertiser each time that a webpage containing an advertisement is viewed by a user. Typically, an advertiser or ad-server will track the number of distinct views by simply counting the total number of hypertext transfer protocol (HTTP) requests made by users to download the advertisement from a server operated by the advertiser or third-party ad network that hosts the advertisement file(s). However, one significant drawback to this approach is that even if an advertisement is downloaded by a browser, it may never actually be displayed in a visible area of its parent webpage and, thus, could not actually be viewable by a user.

For example, FIG. 2 depicts publisher webpage 120 in its entirety—that is, representing all of the content encoded in its corresponding HTML file. FIG. 2 also depicts the viewport 112 of browser 110 in the form of a dashed-line box. Viewport 112 may represent the portion of webpage 120 that is being displayed in or otherwise in focus within browser 110 at any given time. By comparing FIGS. 1 and 2, it can be seen that viewport 112 encompasses only a portion of webpage 120, with the rest of the page running outside the visible area of the browser, a phenomenon sometimes referred to as "page-clipping." For example, although advertisements 134 and 135 are also included within webpage 120, these advertisements will not be displayed in viewport 112 unless a user instructs browser 110 to scroll downward.

Moreover, even if an advertisement is contained within the viewport of a browser, there may be other reasons why it may nevertheless not be visible on a client device screen. For example, as depicted in FIG. 3, in some operating systems, the window of browser 110 may be positioned within a graphical user interface (GUI) desktop 300 such that a portion of the window runs off of the visible area of the device screen, a phenomenon sometimes referred to as "screen-clipping." In the example of FIG. 3, even if advertisements 131-133 were within the viewport of browser 110, such advertisements might never be displayed to a user if they were positioned only within a screen-clipped area of the viewport.

Similarly, as depicted in FIG. 4, objects within a webpage might not be visible to a user, even if they are included in the viewport of the browser, if they are positioned within an area of the viewport that is obscured by another window or object. For example, as depicted in FIG. 4, although advertisements 131-133 are within the viewport of browser 110, only advertisement 133 is visible, advertisements 131 and 132 being obscured by another window 400.

An advertisement may not be visible, or fully visible, on a device screen for other reasons, despite having been downloaded by a browser. For example, a webpage may be downloaded and rendered in a separate browser window or tab that the user never brings to the foreground, or an advertisement may be contained within an area of a publisher webpage that has smaller dimensions than the dimension of the advertisement, in which case the advertisement may be only partially displayed.

In any of these and other cases in which an advertisement is downloaded but not displayed, or not fully displayed, on a client device screen, an advertiser or third-party ad network may nevertheless credit the publisher with a view, since the client device requested the advertisement from the ad-server, even though the advertisement was never displayed or not fully displayed, or since, absent manual inspection of the publisher webpage, the advertiser or third-party ad network may know only that the advertisement was downloaded by the user. As a result, advertisers may pay commissions for a significant number of downloaded advertisements that were never actually fully visible (or could never have been visible) to users. This could result in advertisers being susceptible to fraudulent activity designed to illegitimately increase impression counts without actually displaying the requested advertisements to end-users.

Various techniques have been proposed for determining accurate view-counts for electronic advertisements that do not rely merely on download statistics, but are also able to determine whether electronic advertisements have been displayed in a viewable area of client device screens and how end-users interact with those advertisements. However, these techniques have drawbacks because they are designed for static advertisements, advertisements that are the only thing displayed in their window, frame, or area of the screen and advertisements that do not change over time after being downloaded, and such techniques do not properly account for the measurement of video advertisements or other video content presented within a video player on a webpage.

For example, a third party measurement entity may be able to determine whether the container containing the video player is within a viewable portion of the client device, but it does not have access to the video player itself in order to determine the state of the player and whether or when the player is displaying advertising. Accordingly, the third party measurement entity suffers a drawback in that it may not even know whether the video player successfully loaded or not or whether the video started playing. Furthermore, because of limited access to the video player, a third party measurement entity is not be able to determine whether the portion of the video player that displays the video content (as opposed to, for example, displaying video controls such as a play or pause control) is actually visible on the client screen or not. Additionally, because of limited access into the video player, conventional techniques cannot determine when a video advertisement is actually played or when the video advertisement stops. Further still, due to layered and opaque relationships between video content providers and video advertising providers, conventional techniques cannot determine which particular video advertisement is actually played within a video player.

Accordingly, online advertising may be improved by techniques for determining accurate view-counts for electronic advertisements that do not rely merely on download statistics, but are also able to determine whether electronic advertisements have been displayed in a viewable area of client device screens. In addition, online advertising may be improved by techniques that enable the monitoring of the visibility of video advertising content on a client device.

SUMMARY

The present disclosure addresses the current drawbacks and presents these and other improvements to online advertising and online audience measurement. In some embodiments, a browser may receive a piece of client-side code in connection with an advertisement. The client-side code may determine whether the advertisement has been visible within a client application by consulting one or more window-draw-count properties associated with the advertisement. In one embodiment, if the advertisement has a non-zero window-draw-count, it may be inferred that the advertisement was visible in the client application at some point. In another embodiment, a plurality of objects, such as transparent pixel images, may be placed on or around the advertisement. If only some of the transparent pixel images have non-zero window-draw-counts, then it may be inferred that only a portion of the advertisement was visible.

In another embodiment, for browsers that do not expose window-draw-count properties for images or other objects, the client-side code may attempt to draw (or repeatedly redraw) a first reference image in the webpage on or near the advertisement and a second reference image in an area of the webpage that is guaranteed or likely to be non-visible. The client-side code may maintain document-draw-count metrics associated with the first and second reference images that reflect the success or failure of the draw attempts and/or the draw-frequency of each reference image. If the values of document-draw-count metrics associated with the first reference image are substantially similar to the values of the document-draw-count metrics associated with the second reference image, then it may be deduced that the first reference image, like the second reference image, was never visible, and, thus, the advertisement was also never visible.

In addition, this disclosure presents systems, methods, and computer-readable media for measuring the visibility of video (such as a video advertisement) on the display of the computing device. Various ones of the disclosed systems, methods, and computer-readable media perform functions and operations that include detecting a tracking event in the video; measuring the visibility of the video on the display of the computing device in response to the tracking event that was detected; generating visibility information that represents the visibility of the video according to the measuring; and presenting the visibility information, which may include transmitting the visibility information to a remote computer. In various embodiments, the functions and operations may further include obtaining a measurement component that performs the measuring, which may include downloading measurement code from a remote computer, injecting the measurement component into a webpage, and/or modifying a document object module (DOM) representing the webpage to include the measurement component. In other embodiments, the functions and operations may further include communicating, by a video player executing on the computing device, the tracking event that was detected to a measurement component that performs the measuring. In still other embodiments, the functions and operations may further include measuring the visibility of at least a portion of a video player that is playing the video on the computing device.

Still other variations of the disclosed systems, methods, and computer-readable media perform functions and operations that include receiving a file describing a video ad, and then determining whether the file contains a specified flag. If the file contains the specified flag, then executing an initialization component associated with a video player; receiving a measurement component; incorporating the measurement component within a web page containing the video player; determining whether a tracking event occurred; and if the tracking event occurred, then communicating the tracking event from the initialization component to the measurement component; and performing, by the measurement component, visibility measurements as appropriate.

In some embodiments, initialization code may be incorporated into video advertising content that is downloaded by a client device. The initialization code may determine whether visibility information associated with video content should be measured and, if so, may execute measurement code to measure the visibility information. The initialization code may be incorporated into a video player or embedded within other content associated with a web page. The initialization code may be hard-coded or dynamically loaded. Once executed, the initialization code may review metadata associated with video content to be played within the video player in order to determine whether to measure visibility information associated with the video content.

In various embodiments, the metadata associated with the video content may include information associated with video advertising to be played within the video player. The metadata associated with the video content may also include additional information regarding the video advertising to be played, including: an identifier identifying the video advertisement to be played, the URL or other address information regarding where the video advertisement is located, when to begin displaying the video advertisement, the duration of the video advertisement, the size of the video advertisement, or the size of the video player itself. The metadata associated with the video content may also include event callback instructions to be executed when certain events occur in relation to the video advertisement. In some embodiments the event callback instructions may include instructions to be executed when the video advertisement begins playing, when the video advertisement has played halfway, and/or when the video advertisement has finished playing.

In some embodiments, if a content provider desires measurement of the visibility of its video content, the content provider may include at least one measurement flag, or other indicator(s), within the metadata associated with the video content. In some embodiments the measurement flag may be a parameter included in the URL or address of the video content and/or in the event callback instructions associated with the video content. In one embodiment, the initialization code determines whether visibility information associated with the video content should be measured by searching for the measurement flag within the metadata associated with the video content.

In one embodiment, the first time that the initialization code encounters a measurement flag within the metadata associated with the video content, the initialization code initializes measurement code to determine the visibility of the video content on the display screen of the client device and report that information to a measurement server. The measurement code may be included in the initialization code or may be downloaded from a measurement code server. In some embodiments the measurement code may only execute to measure visibility when certain events occur in relation to the video content. In some embodiments the measurement code may only execute when an event occurs in relation to the video content whose associated event callback instruction includes a measurement marker. For example, in some embodiments the measurement code may only execute to measure visibility information associated with the video content when the video content begins playing and the associated start event callback instruction includes a measurement flag; when the video content reaches its midpoint in duration and the associated midpoint event callback instruction includes a measurement flag, or when the video content ends and the associated completed event callback instruction includes a measurement flag.

In some embodiments when a video player encounters an event callback instruction that includes a measurement flag, the video player may pass the callback instruction to the initialization code. The initialization code may parse through the event callback instruction and extract context information associated with the event and the video content. In some embodiments the context information may include information regarding the size and offset of the video content associated with the event callback instruction or the duration of the video content at the time of the event. The initialization code may pass the extracted context information to the measurement code. The measurement code may use the context information in order to determine visibility information associated with the video content and transmit the visibility information to a measurement server.

In some embodiments, the measurement server may generate reports using the visibility information generated by the measurement code. The reports may provide a variety of metrics associated with the visibility of the video content. The reports may be provided to or accessed by a video content provider.

Additional objects, advantages, and embodiments of the invention will be set forth in part in the description that follows, and in part will be obvious from the description, or may be learned by practice of the invention. The objects, advantages, and embodiments of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings:

FIG. 2 is a diagram depicting an exemplary comparison between a publisher webpage that includes third-party advertisements and a web browser viewport, consistent with certain disclosed embodiments;

FIG. 8 is a diagram depicting an exemplary ad-code that may be used to serve an online advertisement to a client device, track the visibility of the advertisement on the client device, and report the visibility to a metric server, consistent with certain disclosed embodiments;

DETAILED DESCRIPTION

Figure 1:
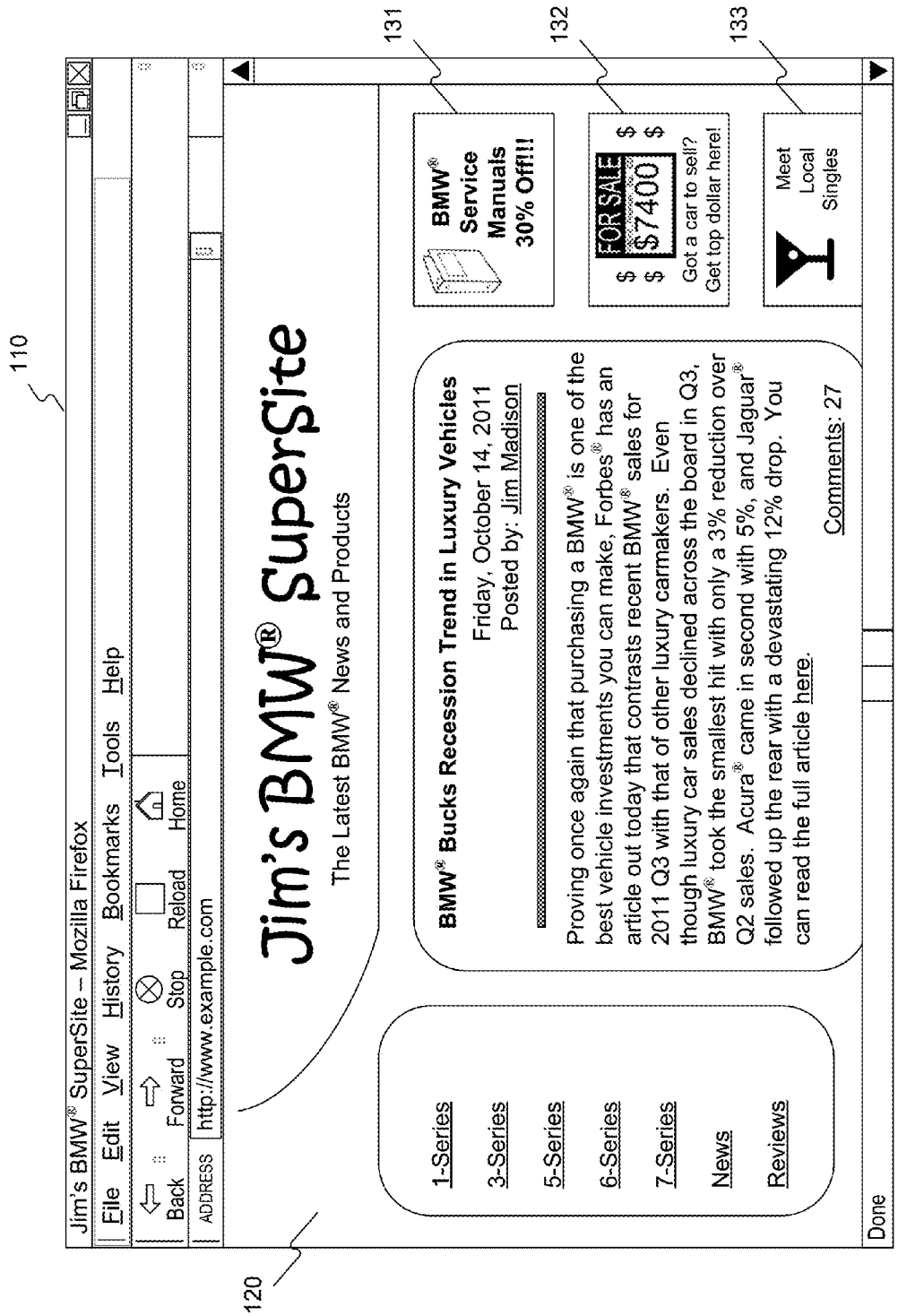
FIG. 1 is a diagram depicting an exemplary publisher webpage that includes third-party advertisements, as rendered by a web browser and displayed on a client device screen, consistent with certain disclosed embodiments.

The following detailed description refers to the accompanying drawings. Wherever convenient, the same reference numbers are used in the drawings and the following description to refer to the same or similar parts. While several exemplary embodiments and features of the invention are described herein, modifications, adaptations, and other implementations are possible, without departing from the spirit and scope of the invention. Accordingly, the following detailed description does not limit the invention. Instead, the proper scope of the invention is defined by the appended claims. In the following detailed description and in the accompanying drawings, all trademarks belong to their designated owners and are used in this application solely for illustration or technical description purposes.

Figure 5:
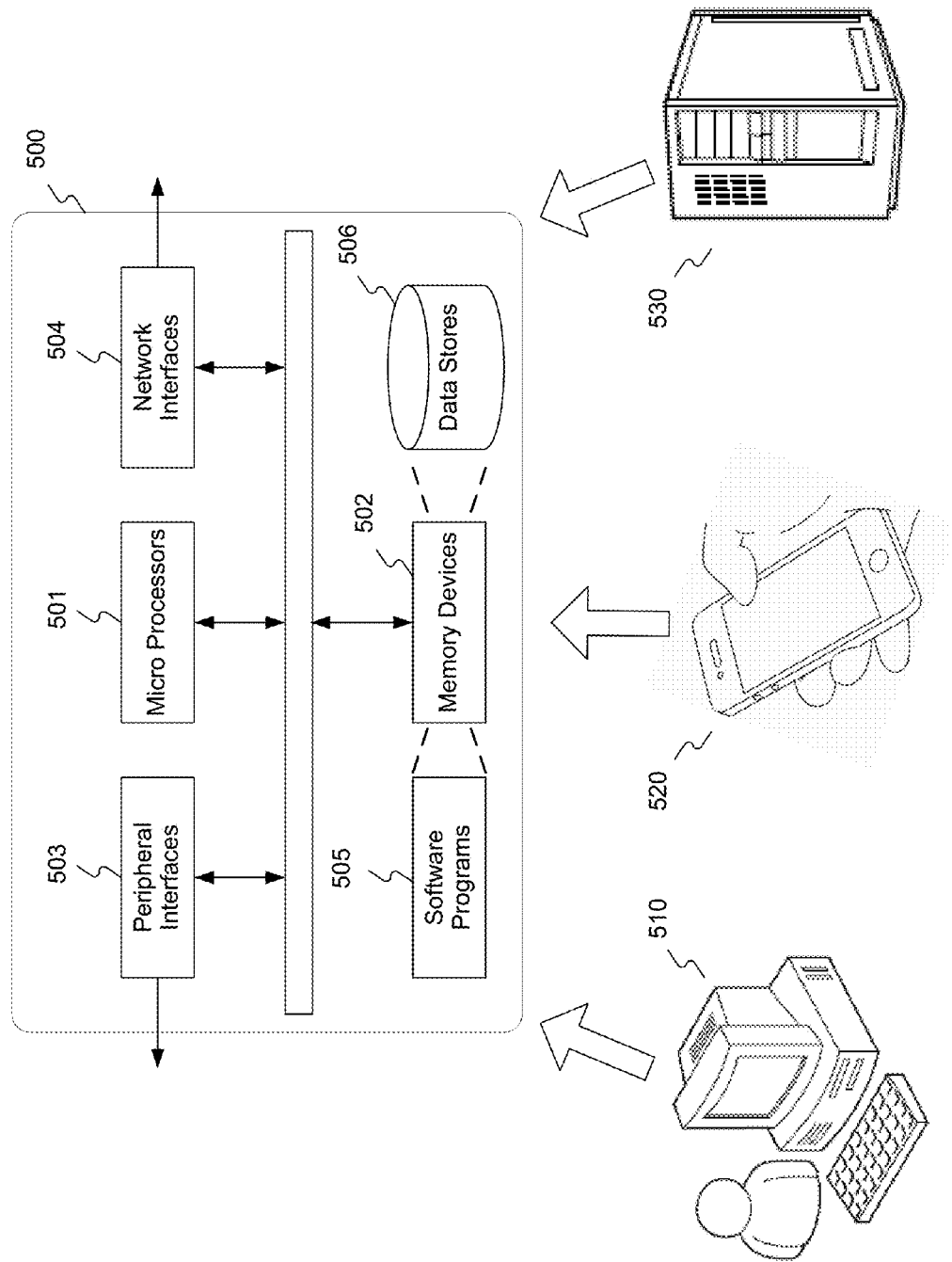
FIG. 5 is a diagram depicting an exemplary hardware configuration for various devices that may be used to perform one or more operations of the described embodiments, consistent with certain disclosed embodiments.

FIG. 5 is a diagram depicting an exemplary hardware configuration for various devices that may be used to perform one or more operations of the described embodiments. As further described below, operations for determining the visibility of an advertisement on a client device may be performed by the client device itself, which may be, for example, a traditional personal computing device 510, such as a desktop or laptop computer, a mobile device 520, such as a smartphone or tablet, a kiosk terminal, a global position system (GPS) device, etc. The client device may receive client-side code that is executed by a processor for performing ad-visibility determinations from one or more external devices 530, such as a web server involved in serving webpages, advertisements, or ad-codes to the client device.

Any of devices 510-530 may comprise a computing device 500 or subsystem that includes one or more microprocessors 501 of varying core configurations and clock frequencies; one or more memory devices or computer-readable media 502 of varying physical dimensions and storage capacities, such as flash drives, hard drives, random access memory, etc., for storing data, such as images, files, and program instructions for execution by one or more microprocessors 501; one or more network interfaces 504, such as Ethernet adapters, wireless transceivers, or serial network components, for communicating over wired or wireless media using protocols, such as Ethernet, wireless Ethernet, code divisional multiple access (CDMA), time division multiple access (TDMA), etc.; and one or more peripheral interfaces 503, such as keyboards, mice, touchpads, computer screens, touchscreens, etc., for enabling human interaction with and manipulation of devices 510, 520, or 530. In some embodiments, the components of devices 510, 520, or 530 need not be enclosed within a single enclosure or even located in close proximity to one another.

Memory devices 502 may further be physically or logically arranged or configured to provide for or store one or more data stores 506, such as one or more file systems or databases, and one or more software programs 505, which may contain interpretable or executable instructions for performing one or more of the disclosed embodiments. Those skilled in the art will appreciate that the above-described componentry is exemplary only, as devices 510, 520, and 530 may comprise any type of hardware componentry, including any necessary accompanying firmware or software, for performing the disclosed embodiments. Devices 510, 520, or 530 may also be implemented in part or in whole by electronic circuit components or processors, such as application-specific integrated circuits (ASICs) or field-programmable gate arrays (FPGAs).

Figure 6:
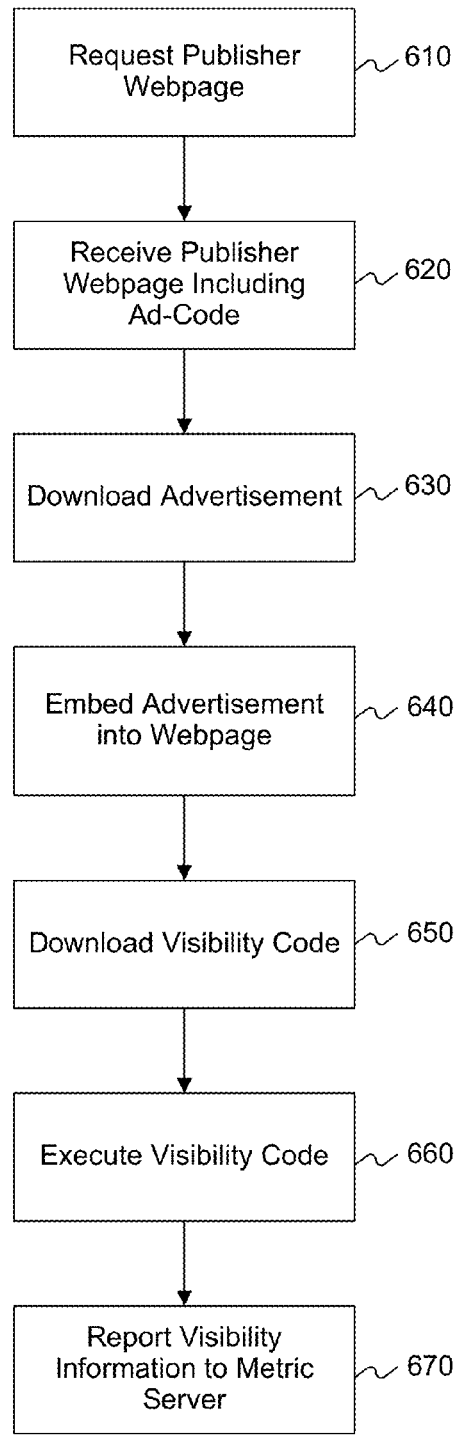
FIG. 6 is a flow diagram depicting an exemplary method of determining the visibility of an advertisement on a webpage downloaded and rendered by a browser on a client device, consistent with certain disclosed embodiments.
Figure 7:
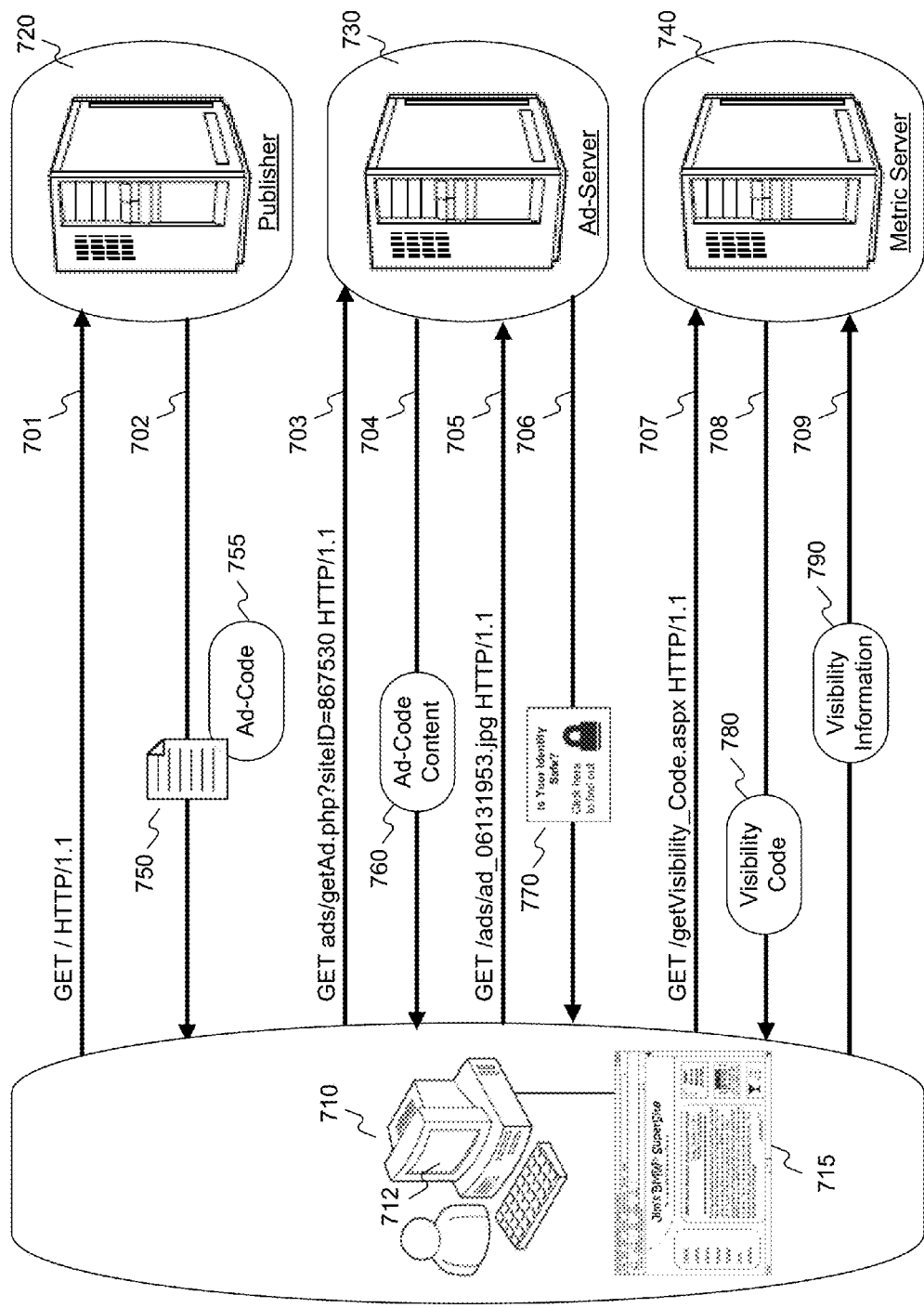
FIG. 7 is a diagram depicting an exemplary network communication sequence in which an online advertisement may be served to a client device and its visibility may be determined and reported to a metric server, consistent with certain disclosed embodiments.

FIG. 6 is a flow diagram depicting an exemplary method of determining the visibility of an advertisement on a webpage downloaded and rendered by a browser on a client device, as further illustrated by FIGS. 7 and 8, consistent with certain disclosed embodiments. FIG. 6 represents a high-level overview of an exemplary process. Subsequent figures will provide further details for various stages.

As depicted in FIG. 7, the process may begin when a client device 710 on which a browser application 715 is running sends a request 701 (e.g., an HTTP request) to a publisher server 720 for a webpage (step 610). In step 620, publisher server 720 sends a responsive message 702 (e.g., an HTTP response) that includes a webpage 750, for example in the form of an HTML file or document. In addition to content, webpage 750 may include an ad-code 755 in the form of an object or element that instructs the browser 715 to download an advertisement.

Ad-code 755 may be any kind of element or instruction that is placed within a publisher webpage that instructs a receiving browser to download an advertisement. For example, an ad-code could be a simple HTML "img" tag that points to an image file on a server that represents an advertisement. In other embodiments, in order to provide more flexibility to advertisers or third-party ad networks concerning which ad to serve to a user, an ad-code may instead instruct a browser to retrieve additional ad-code content from an external server, such as an ad-server. That additional content may then instruct the browser to retrieve an advertisement that has been dynamically selected by an ad-server.

For example, as depicted in FIG. 8 ad-code 755 may come in the form of an HTML IFrame tag 800. IFrame 800 includes a "src" attribute that instructs browser 715 to retrieve additional content from an external server—here, ad-server 730. Thus, browser 715 may send a request 703 to ad-server 730 and receive in response 704 ad-code content 760 that instructs browser 715 to retrieve a particular advertisement.

FIG. 8 depicts exemplary ad-code content 810. Here, ad-code content 810 includes a link to an advertisement in the form of an image file 812. Ad-server 730 may have dynamically selected the advertisement according to a number of different factors. In this example, image file 812 is also hosted by ad-server 730; however, in some embodiments, image file 812 may be hosted by another external server, such as an advertiser's server or a content delivery network (CDN) server specially purposed for fast serving of advertisement content.

Thus, in step 630, browser 715 downloads the advertisement from ad-server 730 by sending a separate HTTP request 705 and receiving an HTTP response 706 that includes the requested advertisement 770 (i.e., image file 812). In other cases, the advertisement may be a video file, Flash™ file, textual element, or other object. In any event, once the advertisement file has been downloaded, browser 715 may position the advertisement within the layout of the webpage downloaded from the publisher server (step 640).

As discussed above, online advertising has traditionally relied on HTTP requests to download advertisements, such as HTTP request 703 depicted in FIG. 7, to determine how many times an advertisement has been viewed. Yet, as also discussed above, this approach often may not yield accurate results, because it fails to account for advertisements that are downloaded by client devices but never displayed in browser applications or on device screens where they may actually be viewed by users.

In some embodiments, in order to overcome these and other shortcomings of conventional online advertising techniques, a client device may receive, in connection with an advertisement, a set of client-side instructions that are capable of determining whether the advertisement has in fact been displayed in a browser application or on the device screen (hereinafter, "visibility code"). The client device may receive the visibility code in a number of different ways. As depicted in FIGS. 7 and 8, in one exemplary embodiment, ad-server 730 may include a tag 814 in ad-code content 810 that instructs browser 715 to retrieve the visibility code, for example in the form of a JavaScript program, from a separate metric server 740. Thus, in step 650, browser 715 may obtain the visibility code by sending a separate HTTP request 707 and receiving an HTTP response 708 that includes the visibility code 780. Browser 715 may obtain visibility code through a number of different techniques. For example, JavaScript resident in ad-code 755 or ad-code content 810 could cause visibility code to be written directly to webpage 750—e.g., using the JavaScript document.write( ) function—which might obviate the need for browser 715 to make a separate HTTP request for the visibility code.

In step 660, browser 715 may execute the visibility code. Once the visibility code executes on the client machine and obtains visibility information regarding displayed content, in step 670, browser 715 may report the visibility information to an external device, such as a metric server 740, by HTTP communication 709, which may be a standard HTTP request, an asynchronous eXtensible Markup Language (XML) HTTP request, a secure HTTP request, etc. In some embodiments, metric server 740 may be a separate server that is dedicated to collecting advertisement visibility metrics and is operated by a third party to provide ad-visibility tracking services to publishers, advertisers, third party ad networks, ad-servers, or other entities.

FIG. 8 depicts an exemplary visibility code 820 in the form of a JavaScript program. Those skilled in the art will appreciate that exemplary visibility code 820, although depicted using JavaScript syntax, is intended for illustration purposes only. In various implementations, visibility code 820 may include additional or different expressions, function calls, or other statements for performing all of the operations necessary to implement one or more disclosed embodiments. Thus, visibility code 820 may be considered merely pseudocode for purposes of illustrating certain basic operations. Moreover, although described as having been transmitted to client device 710 from metric server 740, in other embodiments, visibility code 820 may be received from publisher server 720 (e.g., as part of ad-code 755), ad-server 730 (e.g., as part of ad code content 810), and/or any other server through various HTTP redirects, client-side script operations, nested element links, or other means. In some embodiments, visibility code, rather than being provided to a browser as a code snippet via HTTP, could be injected or inserted into the HTML of a webpage via client-side software, such as client-metering or monitoring software installed on panelist machines, or by some other type of intermediary process or entity, such as an Internet service provider or proxy server.

In some embodiments, visibility code 820 may determine whether an advertisement has been visible to a user by determining the extent to which the advertisement has been drawn on client device screen 712, within a browser viewport, and/or within a webpage data structure maintained in browser memory. These three concepts, which may be referred to as "screen-drawing," "window-drawing," and "document-drawing," respectively, will now be further described.

In some embodiments, screen-drawing may refer to operations that cause the operating system of client device 710 to draw an object on client device screen 712 by affirmatively causing various screen pixels to change color, brightness, or other aspects of appearance or physical form in order to present the object on device screen 712 for perception by a user. Thus, a screen-draw event may correspond to an object, such as an image, actually being displayed on a device screen.

Figure 4:
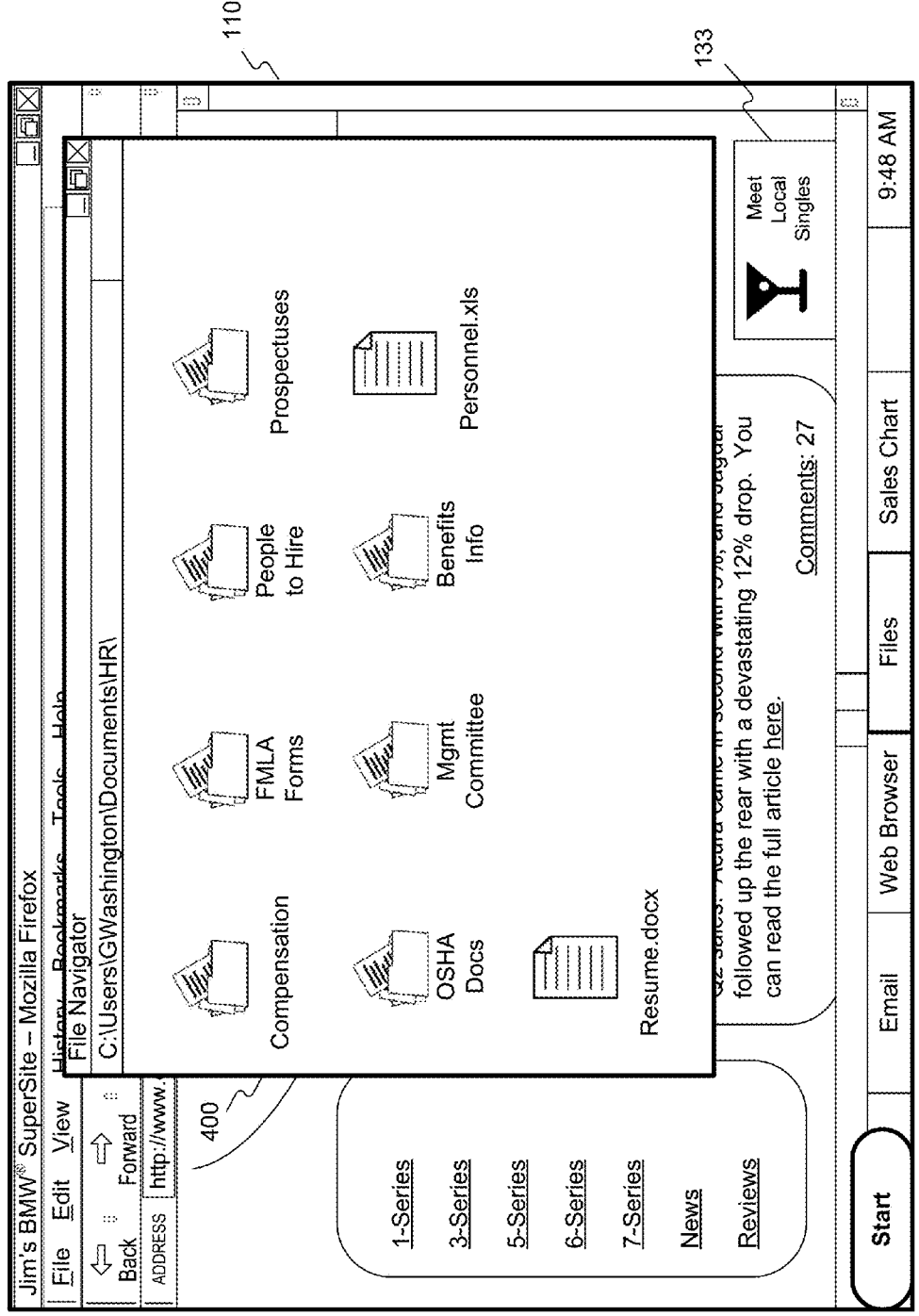
FIG. 4 is a diagram depicting an exemplary window arrangement in which a portion of a web browser viewport has been obscured by another GUI window, consistent with certain disclosed embodiments.

Because a screen-draw of an object may require actual manipulation of pixels on a display screen, any change in the appearance of the object may require a separate screen-draw operation. For example, as depicted in FIG. 1, if browser window 110 is brought to the foreground of the operating system GUI, then advertisement 131 may be displayed on the device screen by a screen-draw operation, which would involve causing the pixels in the region of advertisement 131 to graphically represent advertisement 131. However, as depicted in FIG. 4, if another window 140 is positioned over browser 110 and then subsequently removed, it may be necessary to execute another screen-draw operation in order to cause advertisement 131 to display again on the device screen. Similarly, scrolling, repositioning, resizing, or refreshing operations, etc., that affect which pixels are needed to display or re-display an object on a device screen may result in one or more screen-draw operations.

In some embodiments, in order for visibility code to determine ad-visibility through screen-draw information, it may be necessary for that visibility code to invoke certain lower-level operating system library functions or system calls on the device, either directly or through intermediate libraries. Or, it may be necessary for the visibility code to execute natively on the device.

By contrast, in some embodiments, window-drawing may refer to operations that cause an object to be drawn or displayed within a particular application's GUI window without regard to, or knowledge of, whether the window-draw operation results in a screen-draw of the object. For example, as depicted in FIGS. 1 and 2, because advertisements 131-133 are within the viewport 120 of browser 110, they are rendered and displayed within the browser application window by window-draw operations. By contrast, even though advertisements 134 and 135 are part of webpage 120, such advertisements may not be drawn within the browser application window unless viewport 112 is scrolled so as to display them within the browser application.

Figure 3:
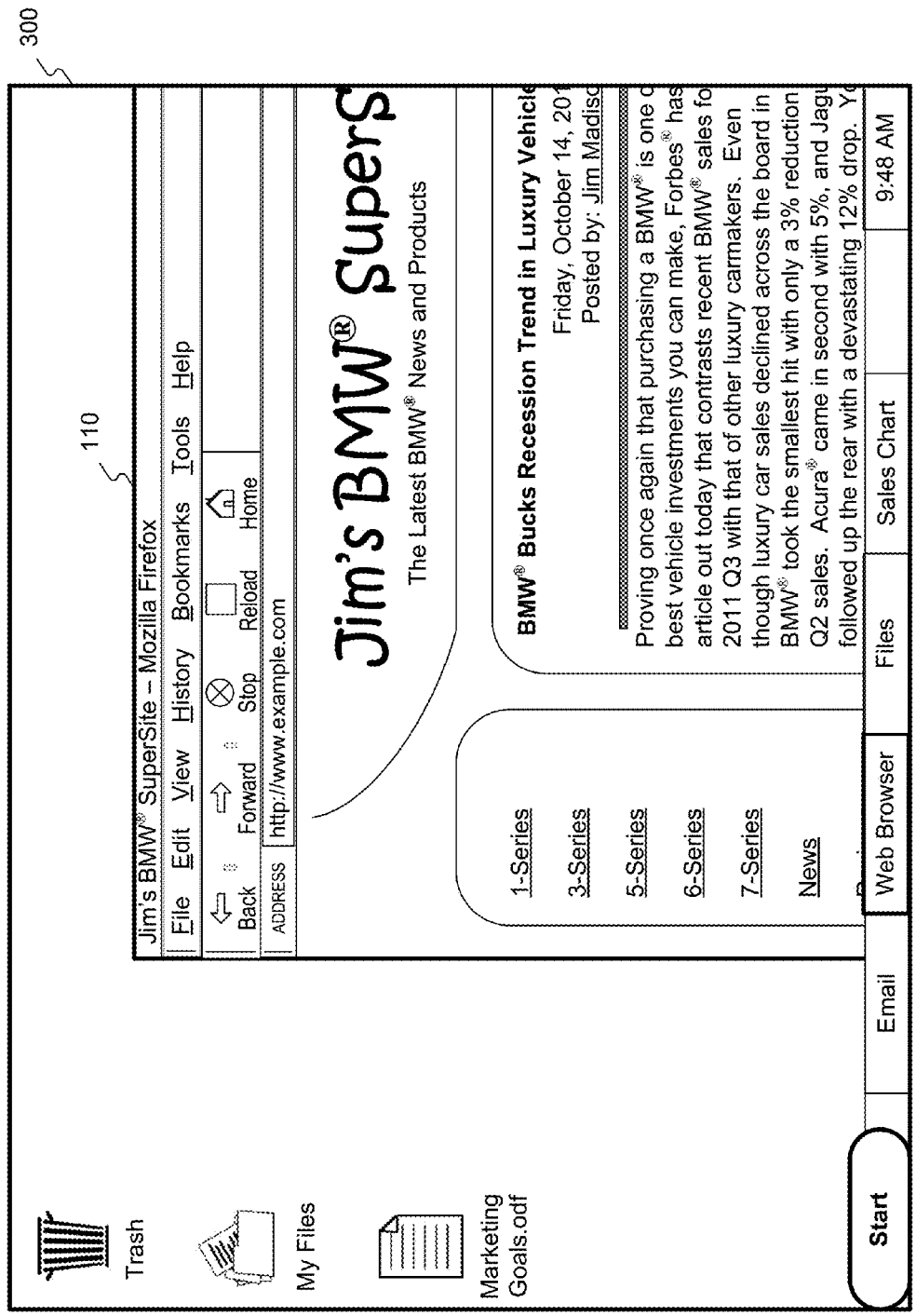
FIG. 3 is a diagram depicting an exemplary screen-clipping occurrence in which a portion of a web browser viewport has been positioned outside of the viewable screen area of a client device, consistent with certain disclosed embodiments.

In some cases, a window-draw of an object may not result in a corresponding screen-draw of the object. For example, as depicted in FIGS. 3 and 4, an object, such as an advertisement, may be drawn onto a browser viewport yet that object may not appear on the device screen if it is obscured by another window or is screen-clipped.

Finally, in some embodiments, document-drawing may refer to operations that cause an object to be added to a data structure maintained in memory that represents a document that may be displayed or rendered by the application in which the data structure is maintained. For example, most modern browsers render webpages by converting downloaded HTML text into an object or data structure in memory that represents the webpage specified by that HTML text, a data structure commonly referred to as the document object model ("DOM"). JavaScript typically operates directly on a webpage's DOM, and can add, remove, or modify elements on the webpage by invoking methods or modifying fields within the DOM.

Thus, in some embodiments, a document-draw operation may represent the operation of adding an object to a webpage by adding it to the webpage's DOM or modifying its properties within the DOM. An object that has been drawn on a webpage as part of a document-draw operation may not always result in the object being drawn within the browser window. For example, if an object is drawn on the webpage at a position that is not currently within the viewport of the browser, the effect of the document-draw operation may be only that the object has been added to the DOM (or modified within the DOM) rather than added to the currently displayed viewport as part of a window-draw operation.

For example, as depicted in FIG. 2, each of advertisements 131-135 has been downloaded and document-drawn onto webpage 120 by browser 110. Thus, in some embodiments, each of advertisements 131-135 would be accessible as objects within webpage 120's DOM. Having been drawn onto webpage 120, each of advertisements 131-135 could be visible (in this example) if a user scrolled webpage 120 displayed by browser 110 to include the advertisement within viewport 112.

To further illustrate various distinctions between screen-drawing, window-drawing, and document-drawing operations, an object could be drawn onto a webpage by JavaScript or other code that causes the object to become a part of the webpage's DOM (a document-drawing operation). Moreover, the object may undergo repeated document-draw operations, such as removing the object from the DOM and then re-adding it, re-positioning the object, re-sizing the object, etc. However, unless the object is added to the DOM (or modified within the DOM) such that it is positioned within the current browser viewport, the object may not be visible within the application and none of the document-draw operations may result in any window-draw operations within the browser application window.

If the object is positioned within the current browser viewport, then the object may be displayed in the browser application window by one or more window-draw operations. For example, if the object is repeatedly scrolled into and out of the viewport, then the object may be repeatedly window-drawn without resulting in any new document-drawing operations. However, unless the browser window occupies the foreground of the device operating system GUI and the object occupies a position in the browser window that is neither screen clipped nor obscured by another window, the object may not be visible on the device screen and none of the window-draw operations may result in any screen-draw operations within the device.

In the present disclosure, it may be determined, deduced, or inferred whether an advertisement was visible to a user by making use of, or consulting information related to, screen-drawing operations, window-drawing operations, and document-drawing operations, or combinations thereof.

For example, in some embodiments, client-side code may have access to information regarding whether an object, such as an advertisement, has been drawn on a client device screen through one or more screen-draw-count metrics. Client-side code may have access to such screen-draw information by virtue of executing natively or directly on the client device as a browser plug-in, executing within a sandbox environment, such as a Java™ Applet or Flash™ file, that provides the client-side code with access to certain lower-level system calls or operating system features, or accessing screen-draw information exposed by a browser in which the client-side code operates.

Figure 9:
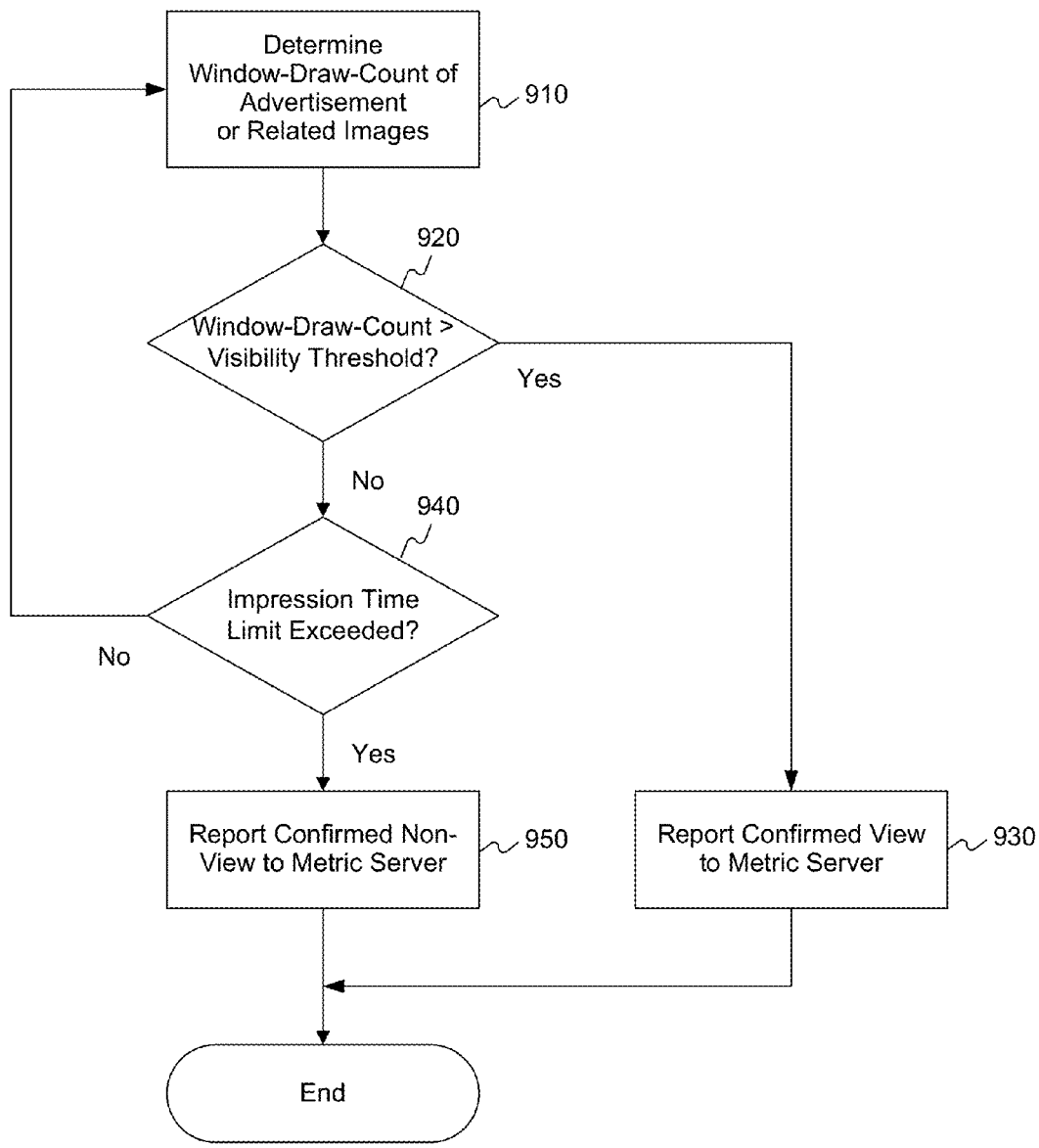
FIG. 9 is a flow diagram depicting an exemplary method of determining the visibility of an advertisement on a client device using window-draw-count information associated with one or more images, consistent with certain disclosed embodiments.

In some embodiments, if screen-draw information is not available to client-side code, it may be determined or inferred whether an advertisement was visible to a user by making use of, or consulting information related to, window-drawing operations. For example, in some browsers, the number of times that an object is drawn within the browser viewport (hereinafter, a "window-draw-count") may be recorded and made available through one or more API or client-side scripting properties, methods, or DOM attributes. In some embodiments, the window-draw-count information associated with an advertisement image or object may be used to determine the extent to which the advertisement was visible. FIG. 9 is a flow diagram that depicts an exemplary method for determining such visibility information using window-draw-counts, as performed by browser 715 when executing visibility code 820 in this example.

In step 910, browser 715 determines the window-draw-count of an advertisement or related images. For example, in visibility code 820, loop 822 periodically checks the window-draw-count of image element 812 (here, in the form of a pseudocode "window draw count" property provided by browser 715's DOM with respect to image elements). In some embodiments, visibility code 820 may check to make sure that image element 812 has been added to the DOM of webpage 750 and that its cascading style sheets (CSS) style has been set to visible before checking image element 812's window-draw-count. In step 920, browser 715 may evaluate whether the determined window-draw-count meets or exceeds a particular visibility threshold.

For example, in some embodiments, such as that represented in visibility code 820, the visibility threshold may be a simple binary determination as to whether the advertisement has ever been drawn within the browser's viewport. Thus, in loop 822, once the "window draw count" property of the "ad 06131954" object is found to be greater than zero, the advertisement may be regarded as having been visible.

In other embodiments, different kinds of visibility thresholds may be employed. For example, to increase confidence that an advertisement was visible in a browser application for a sufficient period of time or that the window-draw-count of the advertisement was not incremented merely for de minimis operations related to the browser's manner of initially rendering the webpage, a higher visibility threshold may be required before the advertisement is classified as visible. In various embodiments, other quantitative and qualitative metrics and comparisons, such as the amount of time that an advertisement has been displayed, may be used to determine whether an advertisement has met one or more visibility thresholds.

If the window-draw-count of the advertisement or related images meets the visibility threshold requirements (step 920, Yes), then, in step 930, browser 715 may report information to one or more servers indicating that the advertisement was likely visible. This information may be reported to the server using to a variety of techniques. For example, as depicted in FIGS. 7 and 8, that visibility information 790 may be reported to metric server 740 as an asynchronous XML HTTP request 709 (see instruction 824). In other embodiments, visibility code 820 may instruct browser 715 to report such information using other means, such as by providing links to a transparent pixel image (also known as a "web beacon") hosted by metric server 740. In FIG. 7, metric server 740 is depicted as a separate server. In various embodiments, however, metric server 740 may also be identical to publisher server 720 or ad-server 730. Metric server 740 may also be operated by the advertiser associated with the advertisement for which visibility information is being determined.

In some embodiments, a browser may report visibility information for an advertisement only if it has been determined that the advertisement has been drawn, or drawn a sufficient number of times, in the browser's viewport (a "confirmed view"), whereas no information may be reported for an advertisement that has not been confirmed as viewed. In other embodiments, a browser may report not only confirmed views, but also when it determines that the advertisement has not been viewed or when it determines that the advertisement was viewed less than a certain number of times within a certain timeframe (a "confirmed non-view").

In some embodiments, the ad-code may set a time limit during which the requisite degree of visibility must be determined in order to qualify as a view. For example, an advertiser may require that an advertisement must be viewed within a specified time after a webpage is downloaded or rendered by a browser in order to credit the publisher with a view commission. Other advertisers may require that an advertisement be visible within a specified time after the occurrence of some other event, such as, for example, after an object is downloaded or added to the DOM, after a viewport is in focus, or after a particular animation finishes playing.

Thus, in step 940, browser 715 may determine whether an impression time limit, representing a particular time frame during which the advertisement must be viewed, has been exceeded. If the impression time limit has not been exceeded (step 940, No), then browser 715 may return to step 910 and continue to periodically check the window-draw-count of the advertisement until the impression time limit expires. For example, loop 822 is coded to examine the "window draw count" property of image element 812 every 100 milliseconds for a total impression time limit of 30000 milliseconds (i.e., 30 seconds). After 30000 milliseconds have elapsed, visibility code 820 no longer examines the window-draw-count and, if the requisite degree of visibility is not achieved, the advertisement may be regarded as a confirmed non-view. In other embodiments, an impression time limit may not be imposed, and a browser may simply report the visibility information to the metric server once a confirmed view occurs, regardless of the time that has elapsed since the webpage was originally downloaded or rendered.

If the impression time limit expires before there is a confirmed view (step 940, Yes) or a confirmed non-view is otherwise determined, then browser 715 may report the confirmed non-view to one or more metric servers 740 or may report metrics associated with the confirmed non-view (step 950). For example instruction 826 may cause browser 715 to send an asynchronous XML HTTP request 709 reporting the confirmed non-view and/or metrics associated with the confirmed non-view. In other embodiments, once the impression time limit expires, processing may terminate and nothing may be reported to metric server 740. In some embodiments, metric server 740 may have access to information about what advertisements were served by ad-server 730 and may infer the non-view if browser 715 does not report a confirmed view within a specified period of time after the advertisement was served to browser 715.

In one embodiment, metric server 740 may use information about confirmed views, confirmed non-views, and inferred non-views to determine visibility statistics for the advertisement across one or more publishers, to determine statistics concerning the publisher's success in displaying one or more advertisements in a visible manner (e.g., to detect potential fraudulent behavior), to determine respective visibility statistics across different advertisements or ad-code formats, etc. Those skilled in the art will appreciate that foregoing examples of information that may be determined by metric server 740 are exemplary only.

In addition to, or instead of, browser 715 reporting conclusions to metric server 740 in the form of confirmed views and/or confirmed non-views, in some embodiments, browser 715 may simply report various metrics that it has gathered concerning the visibility of one or more advertisements. These metrics may include information describing how much of the advertisement was visible, as well as the time period during which the advertisement was fully or partially visible. Such metrics may also include the total window-draw-count of a particular advertisement, the total window-draw-count of the advertisement within a particular window of time (i.e., window-draw-frequency), how the window-draw-count compares with window-draw-counts of other elements in the webpage or with historical metrics for advertisements on the webpage or similar webpages, etc. Those skilled in the art will appreciate that the foregoing exemplary window-draw-count metrics are exemplary only, and that other valuable window-draw-count metrics may be obtained by consulting window-draw-count properties associated with one or more webpage elements.

By receiving visibility metrics from browser 715, rather than visibility conclusions such as confirmed views or confirmed non-views, metric server 740 may employ algorithms to derive its own visibility conclusions for individual advertisements based on rules specific to particular advertisements, advertisers, or ad campaigns, or specific to particular client environments, such as device type, operating system, browser, etc. Using this approach, metric server 740 or advertisers may also be able to dynamically modify rules concerning what kind of metrics are necessary to qualify as confirmed view or a confirmed non-view for a particular advertisement without having to change the logic present in visibility code 820. Also, by hiding the details concerning what kind of metrics will qualify as a confirmed view (e.g., by not including confirmed view determining code in visibility code 820), publishers may be deterred or prevented from modifying any client-side code to create fraudulent confirmed view counts.

Figure 10:
FIG. 10 is a diagram depicting an exemplary method of using a transparent reference image to measure the visibility of an advertisement, consistent with certain disclosed embodiments.

In some embodiments, rather than consulting window-draw-count information associated with an actual advertisement, the window-draw-counts of one or more related images may be consulted. For example, as depicted in FIG. 10, a transparent reference image 1010 may be positioned over an advertisement 135. In FIG. 10, to distinguish between elements, transparent image 1010 is depicted at a slight offset from image 135; however, in various embodiments, the two may occupy the same position and have identical dimensions. In some embodiments, in a manner similar to that described in connection with FIGS. 8 and 9, browser 715 may determine the visibility of advertisement 135 by consulting window-draw-count information associated with transparent image 1010. This technique may be used, for example, when advertisement 135 is encoded not as an image file, but as text, video, Flash™, or other type of object for which browser 715 does not provide or expose a window-draw-count property.

Moreover, by consulting window-draw-counts of one or more reference images related to the advertisement, rather than those of the advertisement itself, a variety of richer visibility metrics may be obtained. For example, as can be seen in FIG. 2, although viewport 112 includes advertisement 133, only a portion of the advertisement would be visible on a device screen in the current viewport configuration. Some browsers may increment an object's window-draw-count property any time that any portion of the object is drawn within the browser viewport, even if only a trivial portion has been displayed.

Moreover, even if an advertisement is included within a visible browser viewport, the advertisement may nevertheless be only partially visible if an HTML element within which the advertisement is contained (e.g., an IFrame) has dimensions smaller than the advertisement itself. Thus, additional mechanisms may be needed to ensure not only that a downloaded advertisement has been made visible in a browser viewport, but that it has also been made visible in its entirety or to a sufficient extent to qualify as a confirmed view.

Figure 11:
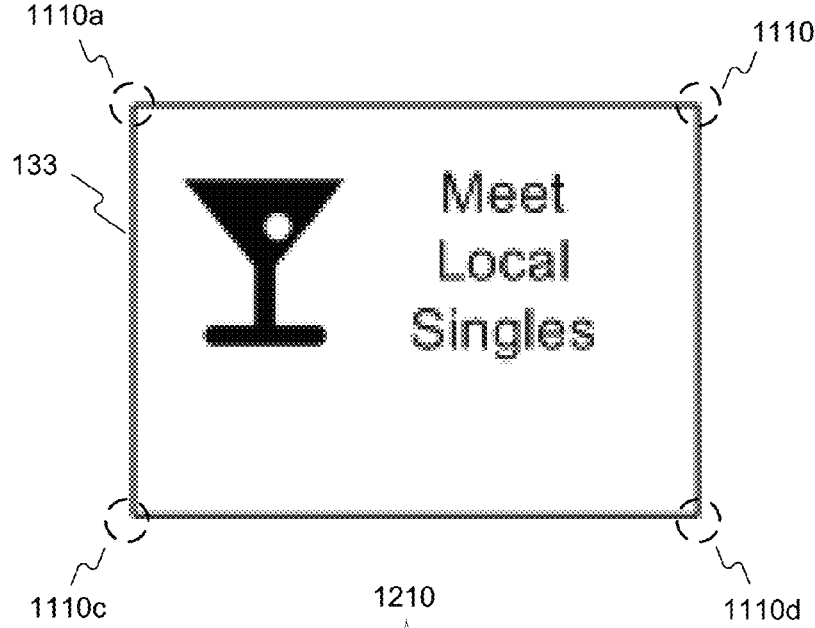
FIG. 11 is a diagram depicting an exemplary method of using a plurality of transparent reference images to measure the visibility of an advertisement, consistent with certain disclosed embodiments.

In one exemplary embodiment, a plurality of reference objects, such as images, may be placed at positions having known relations to the position and dimensions of an advertisement. The window-draw-counts of the reference images may then be consulted and used to infer information about the visibility of the advertisement, based on the known relations. For example, as depicted in FIG. 11, a series of transparent 1×1 pixel images 1110a-1110d (enlarged for purposes of illustration), may be positioned such that one transparent pixel image is placed at or overlapping each corner of an advertisement 133. Using this arrangement, when a top portion of advertisement 133 is displayed in the browser viewport, the window-draw-counts of reference images 1110a and 1110b will be incremented. Similarly, when a bottom portion of advertisement 133 is displayed in the browser viewport, the window-draw-counts of reference images 1110c and 1110d will be incremented.

Thus, for example, in the case of FIG. 2, because only the top portion of advertisement 133 is included within viewport 112, only reference images 1110a and 1110b may have non-zero window-draw-counts. From that information, it may be determined that some portion of the bottom of advertisement 133 was not visible. Similarly, if only reference images 1110a and 1110c had non-zero window-draw-counts, then it may be determined that some portion of the right side of advertisement 133 was not visible. Or, if only three reference images had non-zero window-draw-counts, then it might be determined that some portion of the corner of the advertisement was not visible.

Figure 12:
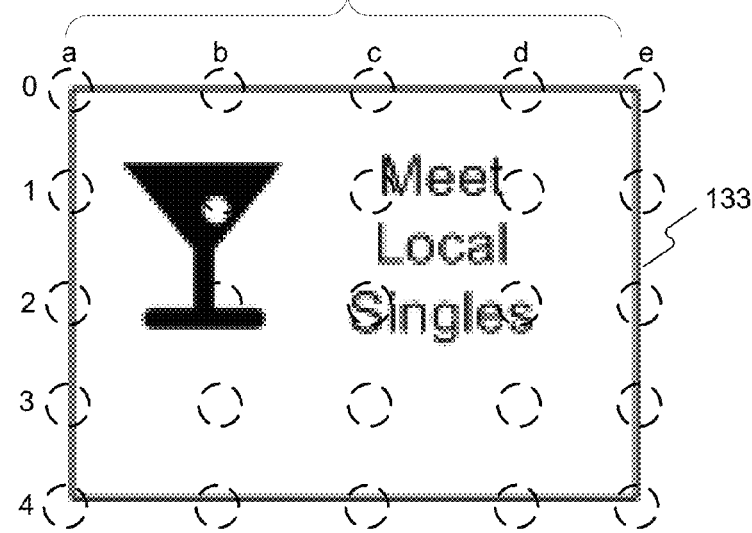
FIG. 12 is a diagram depicting an exemplary method of using a plurality of transparent reference images to measure the visibility of an advertisement, consistent with certain disclosed embodiments.

In some embodiments, information about the extent to which an advertisement has been visible may be enhanced by placing a series of reference images, such as transparent pixel images, throughout the area in which an advertisement is drawn on a webpage or along the perimeter of the advertisement. Window-draw-counts of the reference images may then be consulted to infer how much of the advertisement has been visible based on potentially differing window-draw-counts of the reference images. For example, as depicted in FIG. 12, a series of transparent pixel images 1210$a_0$ though 1210$e_4$ (enlarged for purposes of illustration) are arranged in a grid-like fashion over the dimensions of advertisement 133.

Using this arrangement, the partial display of advertisement 133 in FIG. 2 might result in only reference images 1210$a_0$ through 1210$e_2$ having non-zero window-draw-counts. From this information, it may be determined that at most 60% of advertisement 133 can be confirmed as having been visible on a browser viewport. In other embodiments, an even more granular reference image grid may be used, enabling an even more precise visibility percentage to be determined. For example, by using a grid-like arrangement, rich information about potentially different visibility scenarios may be detected, such as partial clipping in the center of advertisement 133 or one or more thin strips obscuring a cross section of advertisement 133.

Those skilled in the art will appreciate that there may be other arrangements, shapes, or sizes of reference objects that may be placed on, around, or outside of an advertisement whose window-draw-counts may be consulted to infer the extent to which the advertisement itself was visible in a browser viewport, within the scope of the invention. Moreover, although described in the context of reference images, such as transparent pixel images, other webpage elements—such as text, vectors, etc.—may be used as reference objects instead of images if window-draw-count properties are exposed for those elements. Although not depicted in pseudocode form, those skilled in the art will appreciate that the embodiments described with respect to FIGS. 10-12 may also be implemented by visibility code 820 or other client-side code transmitted to and executed by browser 715, within the scope of the present disclosure.

In some embodiments, a browser may determine whether an advertisement should be reported as a confirmed view based on the extent to which it was visible. For example, visibility code 820 could instruct browser 715 to report confirmed views only for advertisements that were displayed at 90% or more in a browser viewport, or for which at least the top 70% was displayed, etc. In other embodiments, visibility code 820 could instruct browser 715 to report all determined visibility metrics for the advertisement in order to permit metric server 740 to make its own visibility conclusions based on the received visibility metrics. In still other embodiments, either browser 715 (e.g., pursuant to visibility code 820) or metric server 740 could determine a confidence level reflecting a degree of confidence, numerical or otherwise, associated with a visibility conclusion, based on the determined visibility metrics.

Although the foregoing embodiments have been described with respect to determining window-draw-counts of elements in webpage 750, they are also applicable to screen-draw-counts. For example, if the client-side code has access to operating system information that indicates whether or how many times an object has been drawn on a client device screen, or if such information is exposed by a browser API, then any of the above techniques may be used to determine the visibility of an advertisement based on screen-draw-counts.

In some cases, a particular browser may not provide or expose screen-draw-count or window-draw-count properties for webpage elements. For those cases, the present disclosure also includes techniques for inferring whether an advertisement has been visible in a browser viewport or on a device screen by comparing document-draw-counts of reference objects associated with the advertisement with reference objects that are guaranteed or likely not to be visible. Exemplary embodiments directed to this technique are depicted in FIGS. 13 and 14, which make reference to the exemplary webpage of FIGS. 1 and 2.

Figure 13:
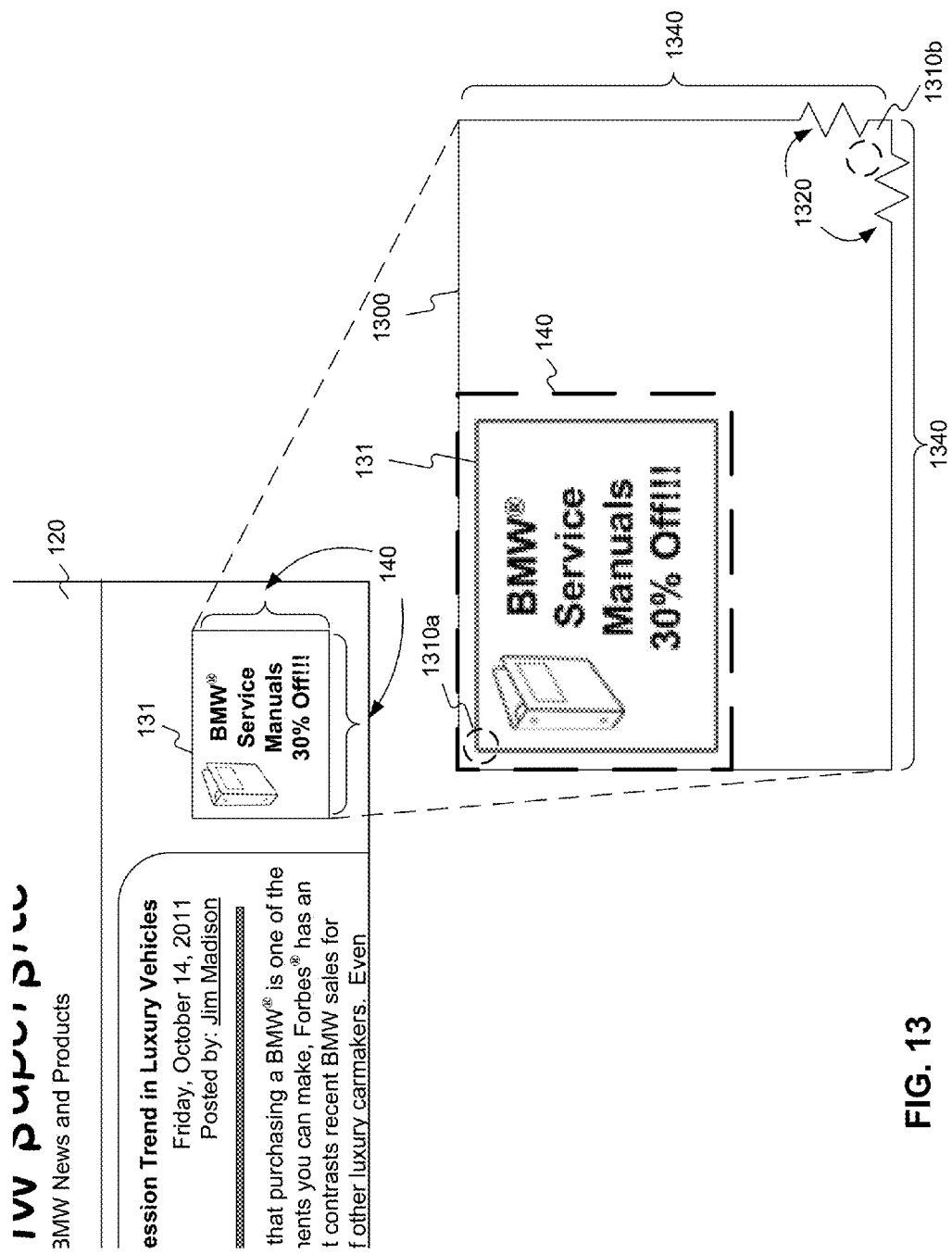
FIG. 13 is a diagram depicting an exemplary technique for placing one or more reference images in an area that is guaranteed or likely to be non-visible, consistent with certain disclosed embodiments.
Figure 14:
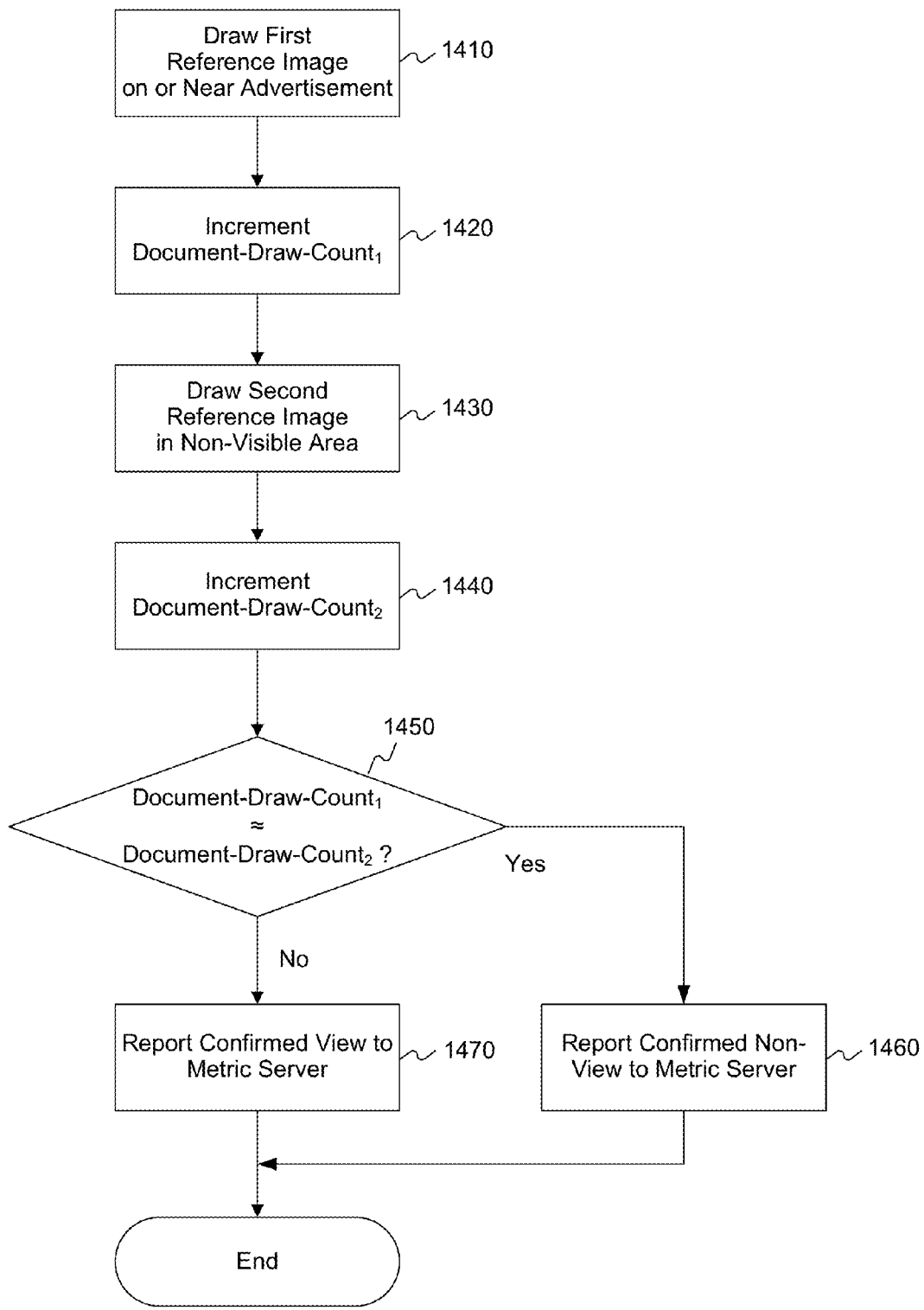
FIG. 14 is a flow diagram depicting an exemplary method of comparing the relative document-draw-counts of two or more reference images to measure the visibility of an advertisement, consistent with certain disclosed embodiments.

FIG. 13 depicts an excerpt of an exemplary webpage 120, including advertisement 131. Although advertisement 131 may be confined to dimensions 140 within webpage 120, advertisement 131 may be placed within a container, such as IFrame 1300 (magnified for purposes of illustration), that has much larger dimensions 1340—for example, 10000 pixels by 10000 pixels. Here, jagged lines 1320 are meant to indicate that dimensions 1340 are not drawn to scale and that the bottom right corner of IFrame 1300 may be thousands of pixels removed from the other portion of IFrame 1300 that is depicted.

Despite spanning potentially thousands of pixels 1340, the display of IFrame 1300 may be confined to the dimensions 140 of the advertisement 131 when incorporated into webpage 120 by layout instructions provided by IFrame 1300, an ad-code containing IFrame 1300, or another element or container within webpage 120. If, in addition to confining IFrame 1300 to dimensions 140, such layout instructions further hide or remove any scrollbars that would otherwise allow a user to scroll through different portions of IFrame 1300 within area 140, then any portions of IFrame 1300 not included within area 140 may never be visible within the viewport of the browser.

In this manner an area within IFrame 1300 may be established that is guaranteed or likely to never be visible (e.g., any portion of IFrame 1300 that is outside of area 140). Document-draw-counts associated with a reference object on or near an advertisement 131 within IFrame 1300 may be compared to document-draw-counts associated with a reference object that is likely to never be visible. To the extent that the document-draw-counts of both reference images are similar or dissimilar, it may be inferred whether the advertisement itself was ever visible. Exemplary steps that may be involved in this embodiment are depicted in FIG. 14 and, in some embodiments, may be performed within a particular limited time period or impression window.

For example, in step 1410, browser 715 (e.g., pursuant to client-side visibility code provided by one or more servers 710-730) may attempt to draw a first reference image onto the webpage and within the area occupied by the advertisement or near the advertisement. As described above, visibility code may draw an object onto a webpage by adding it to the browser's DOM representing the webpage or modifying the object's DOM properties, an operation that may be referred to as a document-draw. Thus, in some embodiments, the document-draw operation of step 1410 may refer not to an instruction to draw the image on a device screen or a browser viewport (which browser 715 may not allow client-side code to perform) but to an instruction to the browser to draw the image on the webpage, as described above. For example, the JavaScript "drawImage( )" function will allow a client-side script to attempt to add an image to a webpage at specified X and Y coordinates on the webpage in which the script resides.

As depicted in FIG. 13, a first reference image 1310a (such as a transparent pixel image) may be attempted to be drawn over advertisement 131 within a given time period. If this document-draw operation is successful, in step 1420, the browser may increment a document-draw-count associated with the first reference image, which may be a simple integer or other data structure maintained by the client-side code that counts the number of times a document-draw operation has been performed for a particular object. In step 1430, the browser may attempt to place a second reference image in an area that is guaranteed or likely to be non-visible, such as reference image 1310b, which may be drawn at a (10000-pixel, 10000-pixel) X-Y position in IFrame 1300 (or, in some embodiments, in a negative-coordinate position, such as −1 and −1). If this document-draw operation is successful, in step 1440, the browser may increment the document-draw-count associated with the second reference image (e.g., by incrementing a second integer or data structure).

After the browser has attempted to draw both the first and second reference images one or more times, the browser may compare their respective document-draw-counts (step 1450). If the values of the first and second document-draw-counts match (step 1450, Yes), either exactly or within a specified threshold of each other, then, in some embodiments, it may be deduced that the first reference image, like the second reference image, was never visible during the time period. Accordingly, because the first reference image is located on or near the advertisement, it may be deduced that the advertisement was also never visible. Therefore, in step 1460, the browser may report the confirmed non-view to one or more metric servers.

If, however, the values of the document-draw-counts differ (step 1450, No) by some pre-determined threshold, then, in some embodiments, it may be assumed that the first reference image was likely visible at some point, because otherwise its document-draw-count might more closely match that of the non-visible second reference image. Accordingly, because the first reference image is located on or near the advertisement, it may be assumed that the advertisement was also visible at some point. Therefore, in step 1470, the browser may report the confirmed view to one or more metric servers.

Those skilled in the art will appreciate that the steps depicted in FIG. 14 are presented in a concise, simplified manner for the purpose of illustrating that the visibility of an advertisement may be inferred by comparing the document-draw-count of a first reference object that may or may not be visible to the document-draw-count of a second reference object that is guaranteed or likely to never be visible. In various embodiments, the precise nature by which the drawing operations of steps 1410 and 1430 are performed and the comparison of step 1450 is made may vary according to the peculiar characteristics of the browser in which the method is performed or according to the type of information that is sought.

For example, in some browsers, if a client-side script attempts to draw an image in an area of the webpage that is not yet in the viewport, the browser may ignore the document-draw instruction in order to conserve resources. In other browsers, the document-draw instruction may fail for other reasons. If the client-side script is able to determine that the draw operation for a reference image has failed (e.g., by instructing the browser to draw the reference image and then determining that the reference image cannot be located within the DOM), then the client-side script may refrain from incrementing its document-draw-count for that reference image. In some embodiments, the client-side script may only execute the document-draw-count incrementing operation if the draw instruction does not throw an exception, throw an error, or otherwise fail.

For embodiments under this approach, the client-side script may determine whether a reference image was ever visible by determining whether it has recorded a non-zero document-draw-count for the reference object. In other embodiments, it may be assumed that a drawing operation for an image in a non-visible location would fail more frequently than a drawing operation for an image in a visible location. In that case, the client-side script may attempt to draw both the first reference image and the second reference image a specified number of times, and may thereafter compare the document-draw-counts associated with each. Thus, in some embodiments, it may be determined that an advertisement was likely visible if the document-draw-count associated with the first reference image is greater than the document-draw-count associated with the second reference image.

By contrast, some browsers may treat instructions by client-side code to draw images in visible and non-visible locations alike, in which case failure or success rates may not be an appropriate proxy. In some embodiments, for these browsers, the client-side script may attempt to redraw both the first and second reference images multiple times and may compare the frequency with which the reference images were redrawn in order to infer visibility information. For example, in some browsers, an instruction to draw an image in a non-visible area of the webpage may execute more quickly than an instruction to draw an image in a visible area of the webpage. This time difference may be explained by the fact that a document-draw instruction for an image within a visible area of the webpage may require an actual window-draw operation in a browser viewport or an actual screen-draw operation on a device screen, whereas a document-draw instruction for an image that is not within a visible area of the webpage may not require any actual screen-drawing operations, window-drawing operations, or other system calls.

This time difference may be exploited to determine whether two reference images have the same document-draw frequency. For example, browser 715 may attempt to draw (or redraw) sample image 1310*a* specified number of times (e.g., 100 times) on webpage 120 and may attempt to draw (or redraw) sample image 1310*b* the same number of times on webpage 120. After both sets of drawing attempts, browser 715 may compare the total time taken to draw each sample image set. If the time taken to perform the redraws for sample image 1310*a* is equal to, or within a predetermined threshold of, the time taken to perform the redraws for sample image 1310*b*, then it may be concluded that reference image 1310*a*, like reference image 1310*b*, was likely not visible on a device screen during the time period in which the respect document-draw-counts were analyzed. Accordingly, it may therefore be deduced that advertisement 131 was also not visible during that time period.

If, however, the time taken to perform the redraws for reference image 1310*a* is significantly greater than the time taken to perform the redraws for reference image 1310*b*, then it may be concluded that reference image 1310*a*, unlike reference image 1310*b*, was likely visible. Accordingly, it may therefore be deduced that advertisement 131 was also visible at some point on a device screen. In some embodiments, rather than attempting to perform the redraws for reference image 1310*a* and reference image 1310*b* sequentially, a browser may alternate between repeating sets of redraw requests for both reference images in an interleaved manner to reduce the likelihood that a temporary slow-down in browser processing might account for total time differences.

In some embodiments, a browser may attempt to repeatedly redraw reference image 1310*a* on webpage 120 for a particular limited period of time and to attempt to repeatedly redraw reference image 1310*b* on webpage 120 for the same period of time. During this time period, client-side code may maintain document-draw-counts for the redraw operations of the respective reference images. Afterward, the total number of redraws for reference image 1310*a* may be compared to the total number of redraws for reference image 1310*b*. Thus, in some embodiments, it may be determined that an advertisement was likely visible on a device screen if the document-draw-count associated with the first reference image is less than the document-draw-count associated with the second reference image.

As described above, reference images need not be actual images, but can be any kind of webpage elements for which document-draw operations can be performed and document-draw-count information maintained. In some embodiments, rather than attempting to draw different reference images at different locations within IFrame 1300, the same reference image may simply be attempted to be drawn at multiple locations. Nor is it necessary that reference images be explicitly redrawn in order to compare document-draw-count timings or frequencies. In other embodiments, a reference image may instead be resized, moved, or otherwise manipulated in a manner that would require the browser to redraw the reference image within the viewport if the object were visible within the viewport.

Other embodiments may employ other techniques to determine whether an advertisement was likely visible on a device screen based on similarities or differences between document-draw-counts of different reference images in an IFrame or other container. Moreover, most or all of the variations described with respect to FIGS. 9-12 may also be applied to the embodiments described with respect to FIGS. 13 and 14. For example, as depicted in FIGS. 11 and 12, a plurality of reference images may be positioned on or near an advertisement. If some of the reference images positioned on or near the advertisement have document-draw-counts similar to that of a reference image that is guaranteed or likely to be non-visible while other reference images positioned on or near the advertisement have document-draw-counts dissimilar to the non-visible reference image, then it may be determined that only a portion of the advertisement was visible.

Similarly, a determination or confidence level as to the visibility of an object may be made locally within the browser, or various metrics may be transmitted to one or more metric servers, where such determinations may be made remotely. Moreover, in any embodiment described in the present disclosure, rather than transmitting such information to an external server, the information may be made available to other scripts executing in the browser or to other processes executing on the same device.

In other embodiments, browser 715 (e.g., pursuant to client-side code provided by one or more servers 710-730)

may determine whether an advertisement contained within an IFrame was likely visible by inferring the location of an IFrame containing the advertisement within an application window or within the device screen. For example, using the "mozInnerScreenX" and "mozInnerScreenY" properties provided by Mozilla browsers, the X and Y coordinates of the top-left corner of an IFrame may be determined in terms of screen coordinates. By coupling these X-Y screen coordinates with known or deduced information about the dimensions of a user desktop or device screen, it may be inferred whether the IFrame is located outside of the dimensions of the desktop or device screen, in which case the advertisement within the IFrame would also likely be non-visible.

In some embodiments, if information regarding the size and position of the browser viewport is not known, the X-Y screen coordinates and dimensions of an advertisement or an IFrame containing an advertisement may still be used to infer visibility of that advertisement. For example, information regarding the average location and dimensions of browser viewports across different standard desktop resolutions can be compiled by analyzing viewport and desktop dimensions across a group of client machines, such as client machines of participants in a research panel. For example, analysis of research panel client machines may indicate that for desktop resolutions of 1024×768 pixels, the average browser viewport in the research panel was located at screen coordinates (100, 100) with dimensions of 800×600. If information regarding the dimensions of the desktop of the client device displaying the advertisement is known, that information may be compared with the average viewport location and dimension information from the research panel to determine the most likely size and dimensions of the browser viewport in the client device. This information may then be compared with the X-Y coordinates and dimensions of the advertisement or its associated IFrame to determine whether the advertisement would be located within the average browser viewport area determined from the research panel. If so, then an inference can be made that the advertisement was visible. In some embodiments, a confidence level associated with the visibility determination for the advertisement may be adjusted to account for the approximation required in such an analysis.

In other embodiments, information regarding the average toolbar and scroll bar area in a browser viewport can be used when determining visibility of an advertisement within the browser viewport. For example, information regarding the average size and dimensions of toolbars in different types of browsers can be compiled by analyzing information regarding toolbar size and dimensions from client machines, such as client machines participating in a research panel. Alternatively, or in addition, information regarding the average size and location of browser viewport scroll bars can also be compiled by analyzing such information from client machines, such as client machines participating in a research panel. This information can then be compiled to generate a list of average toolbar and/or scroll bar sizes and locations for various types of browsers. Accordingly, in some embodiments, if it is determined that a measured advertisement is located within an area of the screen within which an average toolbar and/or scroll bar could be displayed, an adjustment can be made to the visibility information regarding that advertisement. For example, in some embodiments, the advertisement may be considered partially visible or fully non-visible depending on the amount of overlap between the advertisement and the average toolbar and/or scroll bar. In some embodiments, a confidence level associated with the visibility determination may be adjusted to account for the approximation required in this analysis.

In still other embodiments, an advertisement may be placed within an IFrame 1300 having a source attribute that is of the same domain as the parent webpage (also known as a "friendly IFrame"). In some browsers, friendly IFrames are granted access to information about DOM properties of a parent webpage that are not granted to IFrames having differing domains (also known as "non-friendly IFrames"). Using information exposed by the parent webpage DOM, client-side code within a friendly IFrame may determine whether an advertisement within the friendly IFrame was likely visible.

For example, client-side code may first attempt to access DOM information about the parent webpage that would be available only to friendly IFrames. If that information is accessible, then it may be inferred that the IFrame is friendly and further DOM information about the parent webpage and/or browser may be accessed. The client-side code may first determine the X-Y positions of various elements, such as an advertisement or reference objects related to the advertisement, within the browser's viewport. Next, the client-side code may determine the size of the viewport by consulting DOM attributes such as the inner width and inner height of the browser. The client-side code may also consult DOM attributes to determine the size of advertisement or the size or layout of the reference objects. Then, based on the foregoing positional and dimensional information, it may be determined whether the advertisement is fully displayed within, partially displayed within, or fully outside of the browser viewport.

In some embodiments, if an advertisement is placed within a non-friendly IFrame, then it may nevertheless obtain access to the DOM information of the parent webpage if it is nested within a friendly IFrame. For example, the friendly IFrame may be coded to directly access information about the parent webpage provided by the parent webpage DOM and to make such information available to the non-friendly IFrame that is nested within it. In some cases, such information may be passed down through a plurality of non-friendly IFrames that are nested sequentially in a friendly IFrame. Alternatively, absent a nesting relationship, a friendly IFrame may provide parent webpage DOM information to a non-friendly sibling IFrame.

In still other embodiments, client-side code in an IFrame may monitor mouse positions—for example, by monitoring mouse events, such as mouse clicks or mouse movements, that provide mouse position information—to infer the location of the IFrame within the parent webpage or the device screen. For example, the client-side code may examine the X-Y coordinates of one or more mouse pointer positions. If the IFrame is non-friendly, then X-Y coordinate info made available to the IFrame may refer only to X-Y coordinates of the mouse pointer with respect to the IFrame (e.g., assuming a 0-0 origin for the top-left corner of the IFrame), and not to the coordinates of the mouse pointer with respect to the parent webpage or the device screen. Nevertheless, by coupling the provided X-Y coordinates with known or assumed information about the dimensions of a user desktop or device screen, it may be inferred whether an IFrame is located outside of the dimensions of the desktop.

For example, if the provided X-Y coordinates of the mouse pointer are 320 and −27800, respectively, then it can be known that the mouse pointer is located at a Y position that is 27800 pixels above the top-left corner of the IFrame. If it is assumed that most screens, desktops, or viewports do not span 27800 pixels vertically, then it may be assumed that the IFrame was likely in a non-visible area of the webpage when the mouse position was captured. If, after analyzing a certain number of mouse pointer positions, all or most of the analyzed mouse pointer positions suggest that the IFrame was not visible when the mouse pointer positions were measured, then it may be inferred that the advertisement was not visible during the timeframe in which mouse pointer positions were measured. This technique may also be applied to other user or browser actions to which events having coordinate information may be attached. For example, similar techniques may be applied by analyzing touch or gesture positions in devices having touchscreens or other peripheral devices by which users may manipulate GUI displays through physical movements.

Similarly, one or more event listeners—such as the JavaScript "onMouseOver" and "onMouseOut" listeners—may be attached to an advertisement object, or reference objects related thereto, to detect whether a mouse cursor or pointer has moved over or off of the advertisement object or reference objects. If either event is detected, that information may be used to determine visibility.

In still other embodiments, other properties exposed by the browser API, browser DOM, application API, or device API may be used to infer or help infer whether an advertisement was visible. Such properties include, without limitation, information concerning whether a particular browser tab containing the parent webpage of the advertisement has been visible or in focus, information concerning one or more zoom levels used to present a parent webpage, and information concerning whether an IFrame containing the advertisement is displaying scrollbars.

For example, some browsers expose an API or similarly accessible property that indicates whether a webpage is being viewed at a zoom or not, and the amount of zoom used to view the page (sometimes referred to as "zoom level"). The zoom level a webpage is viewed at may change what is visible within the browser viewport for that webpage. For example, if a page is viewed at a 200% zoom level, then there may be a higher likelihood that objects that would otherwise be visible at a 100% zoom level will no longer be visible or will only be partially visible in the browser viewport. Accordingly, in some embodiments, the zoom information can be accessed to assist in the determination of whether a particular image or object on a webpage is visible on the screen.

For example, it may be determined that an advertisement is likely visible or non-visible within a browser viewport or on a device screen using one or more of the above-described techniques. In some embodiments, such a determination may assume a normal 100% zoom level. If it is determined that the zoom level of the browser has changed, then it may be determined whether an advertisement that should be visible at a 100% zoom level would also likely be visible at a different zoom level.

In some embodiments, client-side code may determine the zoom offset used by the browser. The zoom offset may refer to the area of the browser's viewport that is expanded when a zoom level is increased. For example, in some browsers, zooming in may cause the top-left portion of the webpage displayed in the viewport to remain stationary while the height and width of the webpage is decreased by virtue of magnification. In other browsers, the center of the webpage displayed in the viewport may remain stationary such that top, bottom, left, and right portions of the webpage are pushed off of the viewport when a user scrolls in.

Once the zoom level and the zoom offset of the browser have been determined, it may be deduced whether an advertisement would be visible by determining whether an advertisement having a known position within the viewport would remain in the viewport by determining whether that position would have been pushed off the viewport or expanded within the viewport based on the relation of the position to the offset. For example, an advertisement may be positioned at X-Y coordinates (0, 0) within a 1024×768-pixel viewport under a normal 100% zoom level. The advertisement may also have dimensions 200×100 pixels. At some point, it may be determined that the browser zoom level has increased to 200%, which would result in a 512×384-pixel viewport. If the zoom offset for the browser is such that the browser expands or contracts the webpage display while keeping the top-left portion of the webpage stationary at the origin, then it may be determined that the zooming operation did not result in the advertisement becoming non-visible, because its position and dimensions still fit within the modified viewport. However, if the zoom offset for the browser is such that the browser expands or contracts the webpage display while keeping the center of the portion of the webpage that is displayed in the viewport stationary, then it may be determined that the top 256 pixels, the bottom 256 pixels, the leftmost 192 pixels, and the rightmost 192 pixels have been pushed off the viewport as a result of the zoom increase. Because the advertisement would fit entirely within the pushed-off areas of the webpage, it may be deduced that the advertisement would not be visible at the 200% zoom level.

In some embodiments, zoom information can be deduced even if the browser does not expose any zoom information or if such information is not otherwise available. For example, in some browsers the dimensions of a viewport may be represented by DOM inner-height and inner-width DOM properties. At the same time, the dimensions of the full browser window, including areas of the browser window outside of the viewport—such as menu bars, toolbars, status information on the bottom of the window, scroll bars, etc.—may be represented by DOM outer-height and outer-width properties. Under normal 100% zoom level conditions, such inner and outer dimensions may vary by a specified number of pixels. For example, the full browser window may typically have a height that is 200 pixels larger than the viewport and a width that is 100 pixels larger than the viewport.

In some browsers, a change in zoom level may result only in a change of dimensions for the viewport (the "inner" dimensions), while the dimensions of the full browser window (the "outer" dimensions) may remain constant. Thus, in some embodiments, it may be determined that a browser viewport has been zoomed to a non-100% level by determining that the differences between the dimensions of the viewport and the dimensions of the browser window have changed beyond their normal values (e.g., 200 pixels and 100 pixels). If the differences have increased, then it may be deduced that the zoom level has increased. By contrast, if the differences have decreased, then it may be deduced that the zoom level has decreased. In either case, such difference values from before and after a zoom operation has occurred may be compared to derive a difference ratio that can be converted into an absolute or approximate numerical zoom level. In other embodiments, other or additional properties could be analyzed to deduce zoom information.

In some embodiments, information concerning whether an IFrame containing the advertisement is displaying scrollbars can also be used to determine whether the advertisement is visible. For example, in some embodiments, if an IFrame has identical or substantially commensurate dimensions as an advertisement contained within the IFrame, then the presence of scrollbars may indicate that only a portion of the IFrame—and, hence, the advertisement—is visible.

Techniques from any of the above-described embodiments may be combined to enhance the accuracy or confidence level of visibility determinations, or to provide enhanced or complemented metrics about visibility. In any of the above-described embodiments, visibility information or determinations may be reported to one or more external devices or simply made available to other webpage scripts, browser processes, operating system processes, or other device processes. For example, in some embodiments, visibility code could record ad-visibility information within one or more HTTP cookies that are stored in volatile or persistent memory and are subsequently transmitted to one or more servers. In other embodiments, ad-visibility information could be recorded within one or more global variables that are accessible by other scripts, processes, or devices. In still other embodiments, visibility information may be written to a rendered webpage in a browser or features of the webpage may be modified in response to the visibility information. Those skilled in the art will appreciate that the manner in which ad-visibility information is recorded or reported to another script, process, or device is not limited to any one technique or embodiment.

Regardless of how ad-visibility information is collected, stored, or reported, it may be used in a variety of different ways for a variety of different purposes, such as for optimization of content delivery or maximizing advertisement visibility. For example, ad-visibility information may be reported back to publishers. From that information, publishers may be able to determine that advertisements positioned within certain areas of their webpages have lower visibility success rates than advertisements positioned within other areas. As a result, publishers may reformat their webpages to place advertisements in areas of their webpages in which they are more likely to be visible. Similarly, ad-visibility information may be reported to advertisers so that they may determine which publishers have the highest visibility success rates and may select or winnow publishers accordingly.

In some embodiments, if ad-visibility information reveals that a particular advertisement is frequently only partially visible across a number of different publishers, the advertiser may conclude that the advertisement, as currently designed, is too large, and may reduce or redesign the advertisement accordingly. Still further, in some embodiments, visibility code may make a determination as to whether a particular area of a webpage is visible (or likely to become visible) by using one or more of the above techniques before any advertisement is downloaded. The visibility code may then cause an advertisement to be downloaded from an ad-server or third-party ad network and placed in the webpage area only if it first determines that the webpage area is visible, has been visible, or is likely to become visible. Those skilled in the art will appreciate the foregoing uses of ad-visibility information are exemplary only, and that many other uses of ad-visibility information may be made in order to optimize or target advertisements or to make business arrangements between different parties more economically efficient or fair.

In some embodiments, rather than arriving at a binary determination as to whether an advertisement was likely visible or likely not visible, confidence levels may instead be employed. For example, if it is determined that an advertisement has only one draw-count, or only a small number of draw-counts, then that advertisement may be given a low confidence rating by the visibility code and/or a metric server, which may reflect a low confidence that the advertisement was actually visible or viewed by a user. By contrast, if it is determined that an advertisement has a high draw-count, then that advertisement may be given a high confidence rating by the visibility code and/or a metric server, which may reflect a high confidence that the advertisement was actually visible or viewed by a user.

Other factors determined by the visibility code, such as one or more of the factors described above, may also add to or subtract from an assigned confidence rating. For example, an advertisement's confidence level may be increased if a MouseOver event is detected with respect to the advertisement. Similarly, the visibility confidence level assigned to an advertisement may be increased or decreased if a detected or inferred zoom level, as described above either supports or weighs against the likelihood that an advertisement was actually visible in the browser application.

In some embodiments, confirmed views that have confidence levels below a certain threshold may be disqualified, such that publishers are not credited with or compensated for impressions. In other embodiments, the extent of credit or compensation awarded to publishers may be commensurate with the confidence levels of their confirmed views. Confidence levels may be determined by visibility code resident on a client device or by a metric server to which visibility information is reported.

Although the disclosed embodiments have been described primarily in the context of implementation using executable or interpretable code (used interchangeably unless otherwise specified) provided as part of an ad-code or IFrame, the above-described operations may be performed by a browser using any means. For example, the above-described operations may be performed by code that operates within a sandbox environment, such as a Java applet, Flash™ or Silverlight™ code associated with an advertisement, or other code that may be transmitted to a browser by an external server in connection with a webpage. Any of the above-described operations may also be performed by a browser plug-in, add-on, or extension that is downloaded and locally installed on a client device. Similarly, any browser itself may be designed or modified to provide native API functionality for determining information about the visibility of an advertisement and storing or reporting that information, for example using techniques described above. Or, in some embodiments, the browser itself may perform one or more of the above ad-visibility operations with or without the help of client-side code obtained from a server or with respect to a particular advertisement.

In some embodiments, visibility code that is executed on the client device may be structured such that it is neither in the delivery path of the advertisement nor does it participate in the drawing of the advertisement itself. For example, as depicted in FIG. 7, browser 715 may download advertisement 770 and visibility code 780 from separate servers, such as ad-server 730 and metric server 740, respectively. In this example, metric server 740 does not participate in the delivery path of advertisement 770, nor does it have any control over the advertisement served. Similarly, visibility code 780 neither instructs browser 715 to download advertisement 770 nor instructs browser 715 to draw advertisement 770.

Rather, as further depicted in FIG. 8, in some embodiments, visibility code 820 may be structured to monitor only the browser's interaction with the advertisement (for example, image file 812) and not to interact with the advertisement itself. Thus, visibility code may be used to monitor the visibility of any advertisement, even if the visibility code, as transmitted to the browser, has little or no prior information about the advertisement. In this manner, a publisher, advertiser, ad-server, or other entity may use visibility code provided by a third party (e.g., metric server 740) without necessarily having to involve another entity in the process.

For example, as depicted in FIG. 8, when ad-code content 810 instructs the browser to retrieve visibility code from metric server 740 using tag 814, ad-code content 810 passes information identifying the advertisement object to be monitored to the visibility code using a variety of techniques such as, for example, by transmitting the URL parameter "ad name=ad_06131954." By receiving this information, metric server 740 is able to send visibility code 820 that monitors the browser's interaction with the advertisement supplied by ad-server 730 using the advertisement object's ID within the webpage DOM (see code segment 822). In other embodiments, additional information (e.g., object type) or less information may be supplied.

In any case, however, visibility code may be able to operate separately from the delivery or drawing of the advertisement. For example, if the browser is not able to download the advertisement for any reason, then the visibility code may still be able to operate. For example, the visibility code may determine that the advertisement is not listed in the webpage DOM and may therefore determine that the advertisement was not visible in the browser. Further, if the visibility code operates separate from the delivery or drawing of the advertisement, then in some embodiments, any failure of the visibility code to be downloaded correctly or to operate correctly will not affect the browser's ability to download and display the advertisement. These embodiments may, therefore, be distinguished from visibility code that participates in the downloading or drawing of the advertisement, that interacts with the advertisement, or that is not sufficiently separate from the advertisement such that the failure of one would affect the other, as may be the case for some implementations involving sandbox code, such as Flash™, Silverlight™, or Java applets.

In some embodiments, visibility code may also be structured to interact only with a browser or other application that is responsible for displaying one or more advertisements. For example, as depicted in FIG. 8, exemplary visibility code 820 may be structured to interact only with the methods and properties provided by browser 715—here, JavaScript DOM methods and properties provided by browser 715. Thus, in such embodiments, visibility code 820 does not execute natively on device 710 or make use of operating system libraries, system calls, or other functions. Again, these features of visibility code 820 may distinguish it from some implementations involving sandbox code or other code that operates natively on client device 710.

The disclosed embodiments are also not limited to online advertisements, such as advertisements incorporated into webpages, but may also be applied to any kind of content for which it is desired to determine the extent of visibility on one or more client devices. For example, recent advances in mobile device technology, such as smartphones and tablets, have led to an increase in the number of mobile applications (or "apps") available for download. Frequently, developers will offer free versions of mobile apps that generate revenue by displaying advertisements to users when the apps are used on mobile devices. If third-party advertisers pay app developers on a per-view basis, then advertisers may wish to ensure that advertisements are not merely incorporated into mobile apps, but are also displayed in visible areas of mobile device screens. Thus, one or more of the above-described techniques for determining ad-visibility may be performed by an advertisement container downloaded by a mobile device, a mobile app that incorporates the advertisement, and/or the mobile device itself.

The above-described techniques may also be used to determine and report ad-visibility in the context of a traditional computer application or plug-in, desktop widget, etc. For example, a plug-in toolbar extension to a desktop application, such as a web browser, may also display advertisements, and thus it may be beneficial to ensure portions of the toolbar that display advertisements are actually visible in the parent application. Thus, in some embodiments, visibility code may generally reside on a client device (e.g., as part of an application installed on the client device), rather than being downloaded, or may be used to measure visibility of a plurality of different advertisements that may be received by the client device.

Video Content Monitoring

Figure 15:
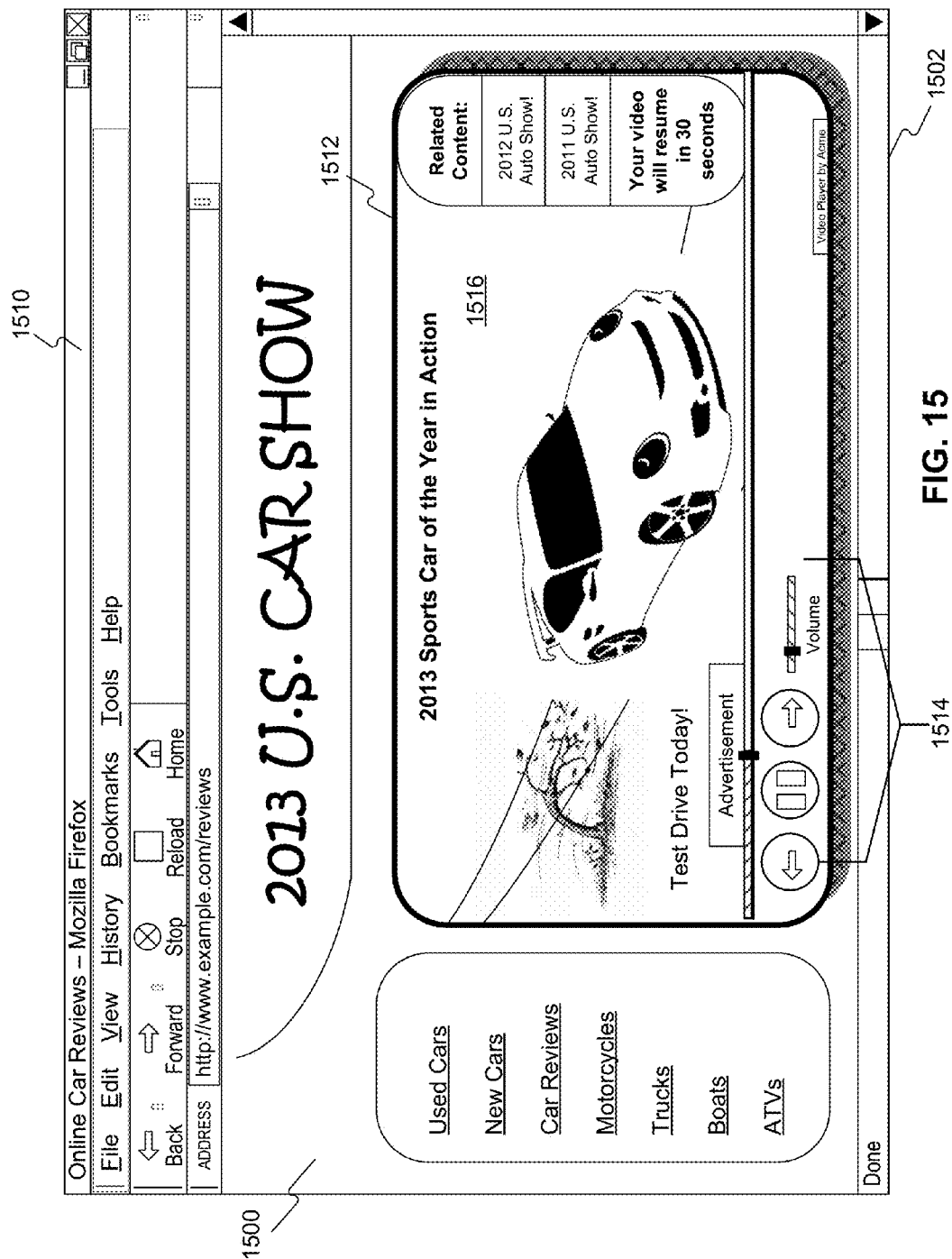
FIG. 15 is a diagram depicting an exemplary publisher webpage that includes a video player which plays video advertising, consistent with certain disclosed embodiments.

FIG. 15 is a diagram depicting an exemplary publisher webpage 1500 that includes a video player 1512 configured to play video or video content such as, for example, video advertisements. The publisher webpage 1500 is rendered by a web browser 1510 on a client device, such as devices 510 or 520, and displayed on the screen of the client device. The publisher page 1500 may include instructions for embedding the video player 1512 as part of the content to be displayed on the page 1500. The video player 1512 may be a separate software component that is downloaded and executed by the web browser 1510, such as an Adobe Flash®, Apple Quicktime®, or Microsoft Silverlight® object, may be a component of the web browser 1510 itself, such as a HTML 5.0 video player, or may be any other type of component able to render and play video content within the web browser 1510. The video player 1512 may include various features within its user interface, such as a video controls 1514 for controlling playback of video content played by the video player 1512. The video player 1512 may also have portion, such as a video pane 1516 that is reserved for displaying video content. The video pane 1516 may be partially or completely obstructed by video controls 1514, depending on the user interface design of the video player 1512. The video player may have the capability of downloading and playing video content, including video advertisements, within the player. The video content may be presented within the video pane 1516 or may be presented in other areas within the video player 1512.

In a manner similar to that explained previous with respect to the advertisements 131-135, the video content (e.g., a video ad) presented within the video pane 1516 of the video player 1512 may be fully visible to a user, partially visible, or not visible at all, depending on whether the video pane 1516 is partially or fully obscured by page clipping, screen clipping, or like effects, some of which were described previously.

One of ordinary skill will recognize that the components, layout and implementation details of the illustrated publisher webpage 1500 are simplified examples presented for conciseness and clarity of explanation. Other components, layouts, implementation details, and variations may be used without departing from the principles of this disclosure.

Figure 16:
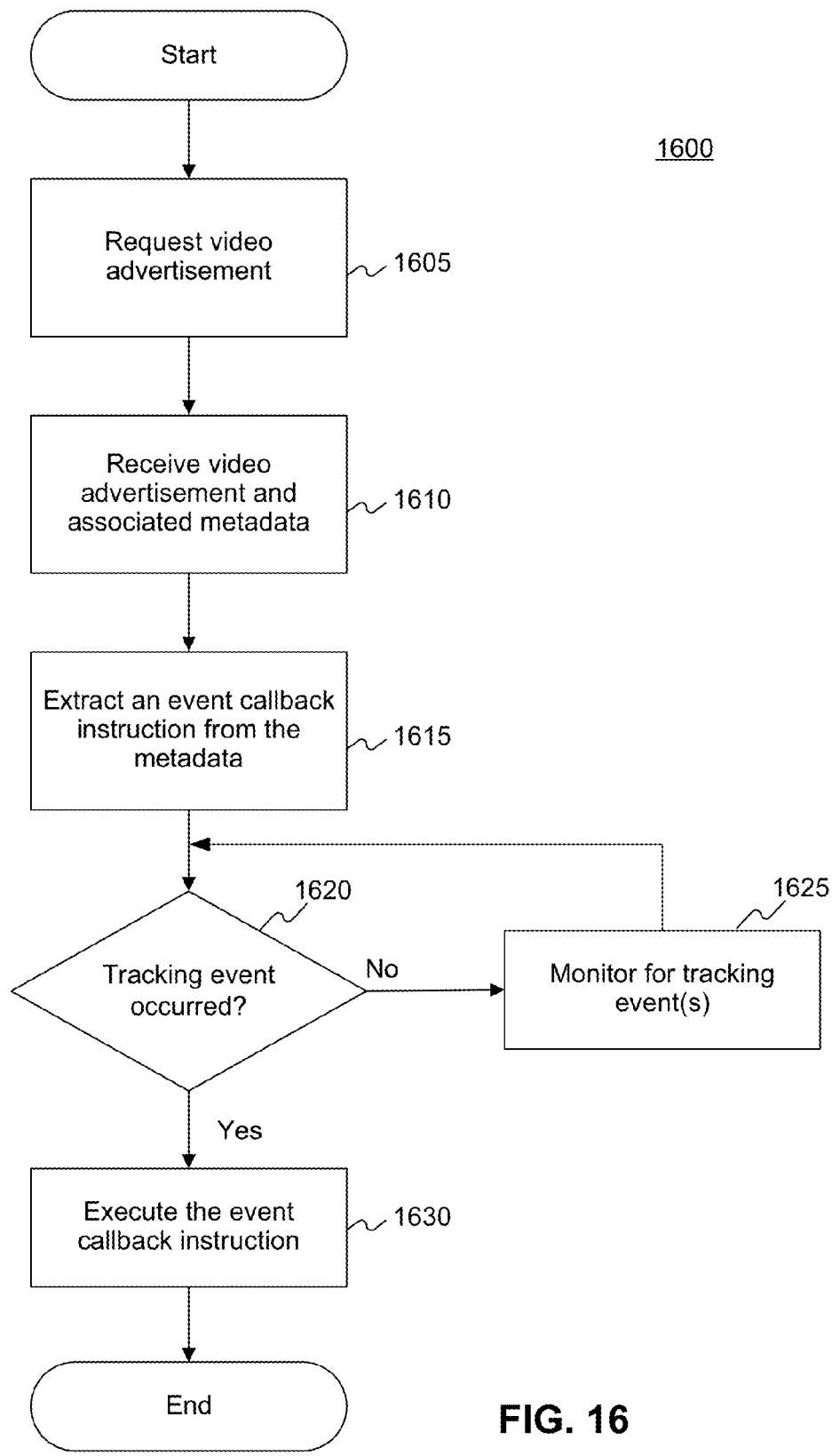
FIG. 16 shows an example of a process for measuring visibility of video playing on a web page, consistent with certain disclosed embodiments of the invention.

FIG. 16 illustrates an example of a process 1600 for monitoring the visibility of video advertisements, consistent with the principles of the invention. In various embodiments, the process 1600 may be implemented by a video player, such as video player 1512. In one embodiment the video player 1512 may be configured to play featured video content as well as video advertisements, also known as video ad creatives, or just creatives. The video player 1512 may play video advertisements at various times such as, for example, before the playback of the featured video content, after the playback of the featured video content, at some time in the middle of the playback of the featured video content, or concurrently with the playback of the featured video content. In some embodiments, the video advertisement may be hosted by an ad-server or by a content delivery network.

As shown in FIG. 16, at stage 1605 of process 1600, the video player 1512 may request the video advertisement, for example, directly from an ad-server or a content delivery network, or it may request a video advertisement from a third party video ad network/broker. The selection of the video advertisement to be played may be based on a variety of criteria, including the topical classification of the publisher page displaying the video player, demographic information associated with the user, the topical classification of the publisher page, the topical or demographic classification of the featured video content and/or any other form of criteria. In various embodiments, the ad-server, the content delivery network or other supplier of the video advertisement may perform the selection in response to the request and accompanying criteria. In some embodiments, the criteria used to select the video advertisement to be played may be provided by the content publisher of the webpage.

In various embodiments, as shown at stage 1610 of FIG. 16, the video player 1512 may receive metadata associated with the video advertisement. In various embodiments, the ad-server, the content delivery network or other supplier of the video advertisement may transmit the metadata that is received. In some embodiments, the metadata may be received along with the video advertisement creative itself. For example, the metadata may be received as part of a file generated in accordance with the Video Ad Serving Template (VAST) protocol. In another embodiment the metadata may be included as part of a Video Player-Ad Interface Definition (VPAID) file instead of, or in addition to, a VAST file. In yet other embodiments, the metadata information may be received separately in advance of or after receipt of the video advertisement creative. In other embodiments the metadata information may be included as parameters in a URI or address associated with the video advertising creative, such as either the URI or address of the creative itself or the URI or address of a server that may be in the communication chain leading to the creative.

In some embodiments, the metadata information associated with the video content may include event callback instructions, which the video player extracts or recognizes, as shown at stage 1615 of process 1600. In some embodiments the video player 1512 may be configured to execute the event callback instructions when certain events associated with video content occur, as illustrated by stages 1620 Yes, and 1630 of process 1600. For example, a VAST file may contain tracking URIs to be requested (e.g., by the video player 1512 or the web browser 1510) when certain tracking events occur. Tracking events may be events related to the playing of the video advertisement, such as when playback of the video advertisement begins, when at least 25% of the video advertisement has been played, when at least 50% of the video advertisement has been played, when at least 75% of the video advertisement has been played, when the complete video advertisement has been played at normal speed, etc. Tracking events may also include events related to user interaction with the video player during the playing of the video advertisement, such as pausing the playback of the video advertisement, unpausing or resuming playback of the video advertisement, fast forwarding during the playing of the video advertisement, etc.

At stage 1630, when a tracking event associated with an event callback instruction occurs, the video player 1512 may execute the event callback instruction. For example, if a VAST file associated with a video advertisement and containing a tracking URI to be requested when a video advertisement begins (e.g., when the "begin" tracking event occurs) is received by the video player 1512, the video player 1512 may generate a request to the tracking URI (i.e., execute the event callback instruction) when it begins playing the video advertisement and detects that tracking event/URI in stage 1620.

In some embodiments, the video player 1512 may parse through the metadata information once it is received. For example, the video player 1512 may parse through a received VAST file in order to confirm that the file conforms to the VAST formatting standards, does not contain missing parts, does not contain other errors, and to detect tracking events.

One of ordinary skill will recognize that the stages, operations, components, layout and implementation details of the illustrated process 1600 are simplified examples presented for conciseness and clarity of explanation. Other stages, operations, components, layouts, implementation details and variations may be used without departing from the principles of this disclosure.

Figure 17:
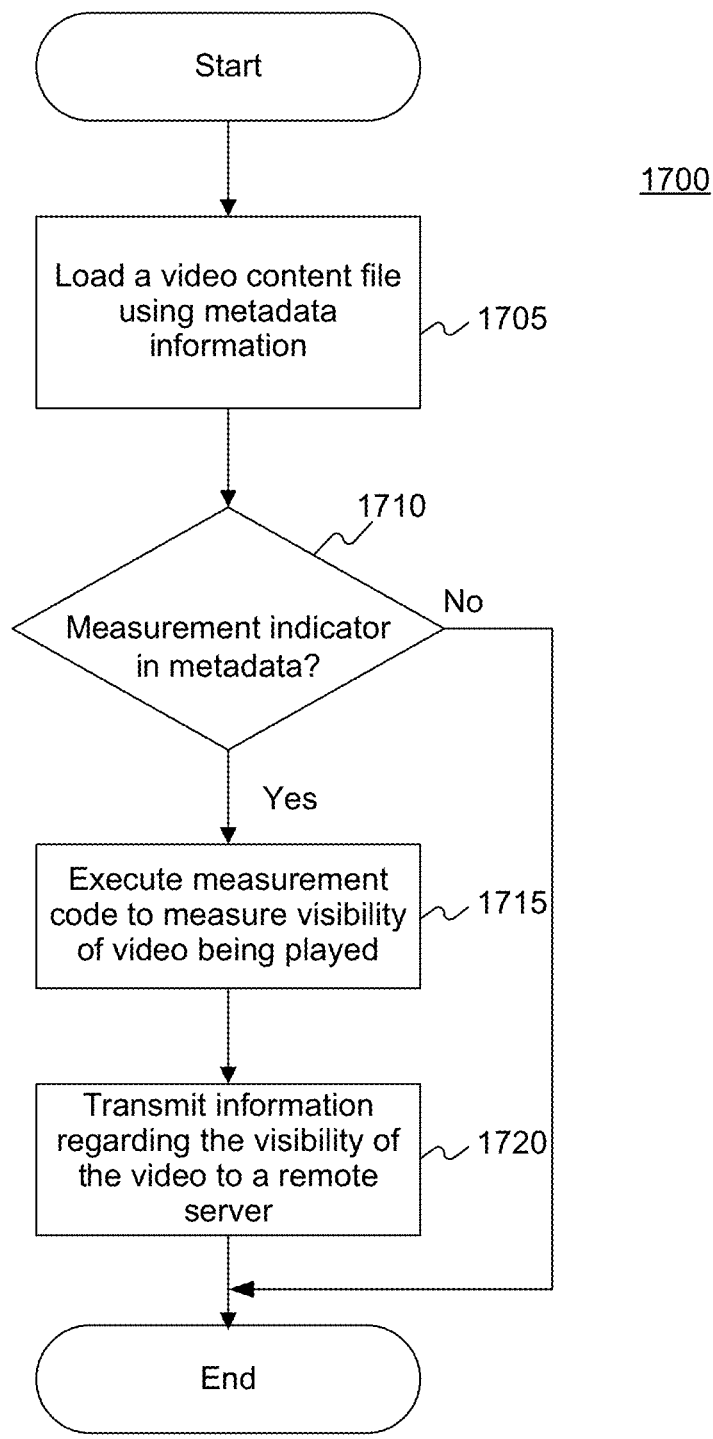
FIG. 17 shows another example of a process for measuring visibility of video playing on a web page, consistent with certain disclosed embodiments of the invention.

FIG. 17 illustrates an example of a process 1700 for monitoring the visibility of video advertisements, consistent with the principles of the invention. In various embodiments, the process 1700 may be implemented by a video player, such as video player 1512. In some embodiments, as shown, stage 1705 of process 1700 may load the video content file using metadata information. For example, the video player 1512 may use the metadata information to load the video content file. Loading the video content file may include preparing the video content for playback and creating event callbacks based on event callback instructions received as part of the metadata information.

At stage 1710, process 1700 may determine whether there is a measurement indicator in the metadata. If not (stage 1710, No), then process 1700 ends without attempting to measure the visibility of the video content being played. If, on the other hand, a measurement indicator is detected in the metadata (stage 1710, Yes), then process 1700 proceeds to stage 1715.

In some embodiments of process 1700, the video player 1512 may execute initialization code that implements stage 1710 when loading the video content file using the metadata information at stage 1705. In various embodiments, the initialization code may be a computer program or arrangement of processor-executable or processor-interpretable instructions that perform initialization functions as described herein. As shown at stage 1710, the initialization code may determine that visibility information associated with video content should be measured (e.g., when there is a measurement indicator in the metadata) and execute measurement code (e.g., visibility code) to measure the visibility information, as shown at stage 1715. In various embodiments, the measurement code may be a computer program or arrangement of processor-executable or processor-interpretable instructions that perform measurement functions as described herein. In various embodiments, the visibility information is information that indicates whether the video content or video creative (e.g., video advertisement) is visible to the user of a device, such as device 510 or device 520, and in some embodiments including information indicating a degree to which the video content or video creative likely or probably was (or was not) visible to the user and/or other attributes (e.g., duration of visibility, etc.). In various embodiments, the visibility information may be output, produced, or otherwise generated by techniques, calculations, or processes that detect, measure, or otherwise evaluate the visibility of all or a portion of the video player 1512 that plays the video content or video creative, where the video player 1512 may have its visibility obscured in some manner—for example, in one or more of the manners described with respect to the advertisements 131-135 in FIGS. 1-4.

In one embodiment, the initialization code may be hard-coded into video player 1512 such that it is part of the logic of the video player 1512. In another embodiment, the video player 1512 may dynamically load the initialization code by either requesting the initialization code from an initialization code server or by dynamically generating the initialization code itself. In another embodiment the initialization code may be embedded within other content associated with the publisher webpage 1500. In various embodiments, the initialization code may be provided by the developer of the video player 1512 or may be provided by any other party for integration into video player 1512.

In one embodiment, if the visibility of a particular item of video content is to be measured, at least one or more measurement flags, or other indicators, may be included within the metadata associated with the video content (see stage 1710). The measurement flags may be provided by the video content provider, such as an advertiser, or may be included by any other party desiring to measure the visibility of the video content.

In alternate embodiments, stage 1710 may not be limited to determining whether there is a measurement flag only in the metadata, but may instead identify measurement indicators in other places. While in the embodiment shown in FIG. 17, the measurement flag may be a distinct data structure within the metadata information associated with the video content, alternatively, or in additional embodiments, the measurement flag may consist of one or more parameters included in the URI or address of the video content and/or in the event callback instructions associated with the video content. In one embodiment, for example, the measurement flag may be one or more parameters included within a tracking URI associated with an event in a VAST file associated with a video advertisement. In another embodiment, the measurement flag may be one or more parameters included within a URI or address associated with the video advertising creative, such as either the URI or address of the creative itself or the URI or address of a server that may be in the communication chain leading to the creative.

In one embodiment, the initialization code may review metadata associated with video content to be played within the video player in order to determine whether to measure visibility information associated with the video content (e.g., stages 1705 and 1710). The initialization code may determine whether visibility information associated with the video content should be measured by searching for a measurement flag or other measurement indicator when parsing metadata information associated with the video content (e.g., stage 1710). For example, the initialization code may search for a measurement flag while it parses through a VAST file associated with a video advertisement. If a measurement flag is located, the initialization code may initialize and load measurement code for measuring visibility information associated with the video content (e.g., stage 1715).

In one embodiment, the first time that the initialization code encounters a measurement flag within the metadata associated with the video content, the initialization code initializes measurement code, which determines visibility information associated with the video content displayed on the display screen of the client device. The measurement code may be part of the initialization code or may be separate software or firmware component, module, program, application, or the like. The measurement code may be hard-coded into the video player 1512 and/or the video creative. The measurement code may be separately downloaded from a measurement code server. Measurement code can be a compiled and executable file, an uncompiled script such as, for example, a Javascript file, or any other set of instructions that can be executed by video player 1512 or web browser 1510.

The initialization of the measurement code may include loading the measurement code. Loading the measurement code may include downloading the measurement code from a measurement code server. In some embodiments, the measurement code provided by a measurement code server may be customized based on certain criteria such as, for example, the type and version of video player 1512, the type and version of web browser 1510, or information regarding the publisher webpage 1500. Loading the measurement code may also include inserting the measurement code into the Document Object Model (DOM) tree associated with the publisher webpage 1510, for example by creating a new DOM object associated with the video player 1512. In some embodiments, as part of the initialization of the measurement code, the initialization code may generate a unique identifier for the video player 1512 and associate it to the video player 1512, for example, by modifying a DOM property associated with the video player 1512 to include the unique identifier. Any other method of associating the unique identifier to the video player 1512 may be utilized. In some embodiments, the initialization code may pass the unique identifier to the measurement code, for example, by appending the unique identifier after a hash ("#") symbol in the URI associated with the request for the measurement code. The measurement code may use the unique identifier to locate the video player 1512 such as, for example, by searching for the object containing the unique identifier within the DOM tree associated with the publisher webpage 1500.

In some embodiments, the initialization of the measurement code may include initializing data structures associated with measuring visibility information associated with the video content. In some embodiments, the initialization code may pass information to the measurement code upon initialization of the measurement code. For example, the initialization code may pass information regarding the type and version of the video player 1512, the name of the developer of the video player, etc. In some embodiments, this information may be passed as parameters in the URI associated with the request for the measurement code. In some embodiments this information may be used by the measurement code server to determine the type of measurement code to transmit to the client device.

In some embodiments, the measurement code may utilize and/or implement the techniques and methods described in the previous sections of this disclosure to measure the viewability of video content.

In some embodiments of stage 1715, once initialized the measurement code may execute during the playback of the video content to measure visibility information associated with the video content. The measurement code may measure visibility information associated with the video content throughout the entire duration of the video content or may execute intermittently during certain parts of the playback of the video content. For example, the measurement code may execute to measure visibility information during the playback of the first 50% of the video content duration, during only the first few seconds of the playback of the video content, during a few seconds of the beginning, the middle, and the end of the playback, or the like.

In some embodiments, the measurement code may only execute to measure visibility when certain events occur in relation to the playing of the video content, such as a tracking event as described above with respect to FIG. 16. The measurement code may execute when an event occurs whose associated event callback instruction includes a measurement marker. For example, the measurement code may execute to measure visibility information when video content begins playing and a start playback event callback instruction includes a measurement flag; when the video content playback reaches its duration midpoint and the associated playback midpoint event callback instruction includes a measurement flag; or when the video content ends playback and the associated playback completed event callback instruction includes a measurement flag. In one embodiment the measurement code may execute when a tracking URI associated with a tracking event in a VAST file includes a measurement flag. For example, the measurement code may execute to measure visibility information when video content playback begins and a "start" tracking event URI includes a measurement flag; when video content has played for at least 25% of the total duration and a "first-Quartile" tracking event URI includes a measurement flag; when video content has played for at least 50% of total duration and a "midpoint" tracking event URI includes a measurement flag; when video content has played for at least 75% of total duration and a "thirdQuartile" tracking event URI includes a measurement flag, or when the video content has played to the end at normal speed and a "complete" tracking event URI includes a measurement flag.

In some embodiments, when the initialization code encounters an event callback instruction that includes a measurement flag, the initialization code may parse through the event callback instruction and extract context information associated with the event and the video content. The context information may include information describing the event that occurred, and the URI of content associated with the event, such as of publisher page 1500. The context information may also include information regarding the size and offset of the video content associated with the event callback instruction. The context information may additionally or alternatively include other information, such as the play duration or play time of the video content at the time of the event, the volume of the video playback at the time of the event, an indication of whether the video content was being played in full-screen mode or not, the state of the video player (e.g., whether it is operating in limited mode or in full-feature mode), etc. The initialization code may pass the extracted context information to the measurement code.

In some embodiments, the measurement code may use the context information in order to determine visibility information associated with the video content. For example, the measurement code may use received size and offset information to determine the location of the video player 1512 and determine the visibility of all or part of the video player 1512 on the screen of the client device, for example, in manners similar to those described with respect to determining the visibility of the advertisements 131-135 described previously. In some embodiments the measurement code may use information regarding the type and version of the video player and/or the state of the video player to determine the location of video pane 1516 and determine the visibility of the video pane 1516 on the screen of the client device. Other context information may be similarly used to determine visibility information associated with the video content.

In some embodiments, as shown at stage 1720 of FIG. 17, the measurement code may transmit visibility information associated with the video content to a remote computer, such as a measurement server via the Internet (e.g., the metric server 740 of FIG. 7). The measurement code may transmit visibility information every time an event is triggered. Alternatively, or additionally, the measurement code may accumulate and log visibility information and transmit the logged information to a measurement server at a later time, e.g., after the video content concludes. In some embodiments, the measurement code may pre-process visibility information to detect and correct errors before transmitting the visibility information to the measurement server.

In some embodiments the visibility information generated by the measurement code can be used to determine whether video content met a predetermined visibility threshold in order to be classified as "viewable" in terms of an overall assessment. This determination may be performed by the measurement code, initialization code, video player 1512, measurement server, or any other entity or process. This determination may include determining whether a certain portion or percentage of the video content was visible on the display screen of the client device. In addition to, or alternatively, this determination may include determining whether the video content was played for a minimum threshold amount of time on the client device. Any other criteria may be used to establish the predetermined visibility threshold.

In one example, the visibility information for video content (e.g., video advertisements) may include data arranged in data fields as shown in Table 1:

TABLE 1

| Video Start Visibility % | Video Middle Visibility % | Video End Visibility % | Playtime % | Viewable Indicator |
| --- | --- | --- | --- | --- |
| 80% | 80% | 70% | 98% | Yes |

For the example of visibility information in Table 1, as shown in the first, leftmost column, the measurement code determined that 80% of the video player 1512 was visible on a device screen when a "video start" tracking event occurred (e.g., perhaps because the video player 1512 was partially obscured (i.e., 20% obscured) at the time of the measurement, for instance by another window, by screen clipping, etc.). Similarly, the measurement code determined that 80% of the video player 1512 was visible on a device screen when a "video middle" tracking event occurred and that 70% of the video player 1512 was visible on a device screen when a "video end" tracking event occurred. In the fourth column of Table 1, the visibility information indicates that 98% of the video content was played by the video player 1512. And in the fifth column of Table 1, the visibility information indicates that the overall assessment of the measurement code is that "yes" the video content played by the video player 1512 was considered to be viewable by the viewer. As is known in the art of online advertising, an overall assessment of "viewable," as well as other visibility information, may be used for various purposes, including determining charges to advertisers, ranking of webpages and websites, determining various advertising statistics, and the like. Further, one of ordinary skill will recognize that the determination and arrangement of data in Table 1 may vary within the principles of this invention. For example, the visibility percentages in the first three columns may be based on the measured viewability of the video pane 1516, which is a portion of the video player 1512, instead of the entire video player 1512.

In some embodiments, a user interface, for example to a measurement server (e.g. metric server 740), may be provided that allows users to view reports generated using the visibility information associated with the video content. In some embodiments the user interface may allow users to generate reports using the visibility information associated with the video content. The reports may provide a variety of metrics associated with the visibility of the video content. The reports may be provided to or accessed by a video content provider. In some embodiments, the visibility information may be used as an input to various other systems or processes, such as systems or processes that calculate advertising costs or revenue, that rank the popularity or usage of websites, that produce internet marketing data and internet analytics, that measure how digital ad campaigns read their audiences, and the like.

One of ordinary skill will recognize that the stages, operations, components, layout and implementation details of the illustrated process 1700 are simplified examples presented for conciseness and clarity of explanation. Other stages, operations, components, layouts, implementation details and variations may be used without departing from the principles of this disclosure.

Figure 18:
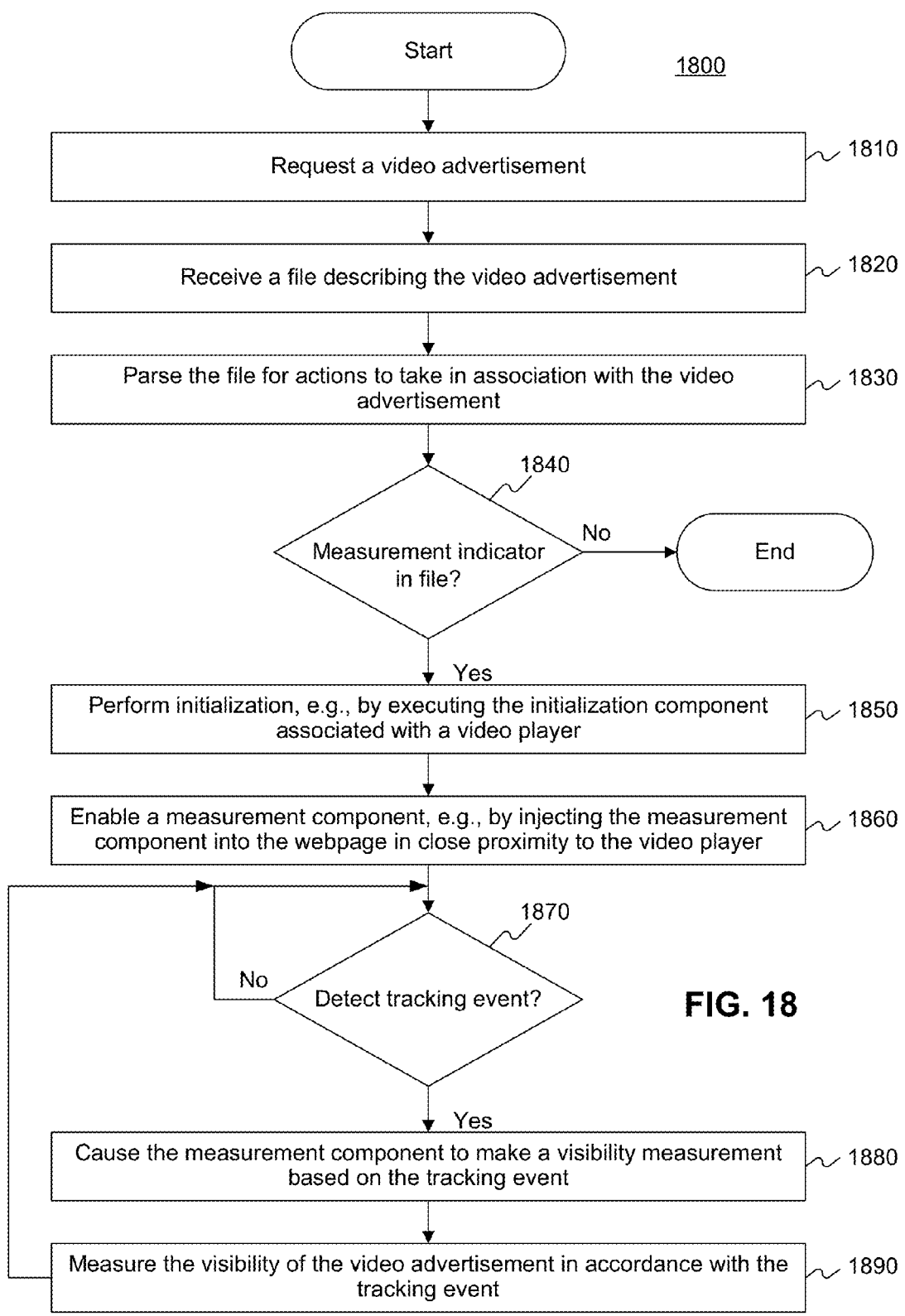
FIG. 18 shows yet another example of a process for measuring visibility of video playing on a web page, consistent with certain disclosed embodiments of the invention

FIG. 18 shows an example of a process 1800 for measuring the visibility of video playing on a web page, consistent with embodiments of the invention. In various embodiments, process 1800 may be implemented by program code executing as part of a video player, such as video player 1512. In the embodiment shown, process 1800 begins by requesting a video advertisement or video ad (stage 1810). In various embodiments, a video player may include an executing component (e.g., program code) that is provided by an advertising network that operates to implement VPAID and VAST functionality, including requesting video ads at appropriate times.

At stage 1820, process 1800 receives a file describing the video ad. In various embodiments, this may be an XML file, such as a VAST-compliant XML file. In various embodiments, the file describing the video ad may include information specifying the content to be played and the data to be measured. The exemplary XML file may include, for example, information specifying a tracking URI start event, midpoint event and complete event. In other words, the file may describe what information to measure (e.g., visibility information) and when to measure that information. The tracking URI may be a URI associated with a measurement server for gathering data on the start, midpoint and complete events. The XML file may also include the URI where the video player can retrieve or access the video ad content. In various embodiments the video ad content can be an MP4 file or the like. In some embodiments, the XML file may point to, or be chained to, another XML file that contains additional information and/or the URI of the video ad, etc.

In some embodiments, from the video player's point of view, the file describing the video ad is treated like a playlist, which tells the video player when to request, for example, a "start" tracking URI; when to execute or play the video ad content; when to request the "complete" tracking URL, etc.

At stage 1830, process 1800 parses the received file for actions to take in association with the video advertisement. In various embodiments, this stage may include finding and scheduling for processing the tracking URIs and associated events, the video ad content, etc.

Process 1800 next determines whether there is at least one measurement flag, or other measurement indicator, in the received file (stage 1840). In various embodiments, this measurement indicator may be a simple flag, a unique parameter value, or the like. In various embodiments, the measurement flag informs the video player whether to measure the visibility of the video ad content associated with the file. The visibility marker may be included in the file describing the video ad (e.g., a VAST XML file) by the advertiser, for the purpose of signaling that the advertiser desires to have the visibility of the video ad accurately measured.

If there is no measurement flag in the received file (stage 1840, No), then process 1800 ends, as there is no need to perform a visibility measurement.

If, on the other hand, there is a measurement flag in the received file (stage 1840, Yes), then process 1800 performs initialization operations. In some embodiments, stage 1850 is implemented by executing an initialization component associated with a video player 1512. In various embodiments, the initialization component associated with the video player will not be executed, or perhaps not even loaded, unless the measurement flag is encountered. In various embodiments, the initialization component may be a set of processor-executable instructions associated with the video player for the purpose of implementing and coordinating visibility measurement functionality between the video ad content being played by the video player and its associated publisher web page.

At stage 1860, process 1800 enables a measurement component. In some embodiments, the initialization component associated with the video player obtains the measurement component (e.g., by downloading it from an ad server 730 or a publisher 720), by reading it from an already downloaded ad file, etc.) and then injects the measurement component into the web page containing the video player in close proximity to the video player. For example, the initialization component may generate a URI request for the measurement component (which may, for example, be a JavaScript that performs visibility measurements) and then inject the measurement component into the publisher webpage right below (or elsewhere close to or on) the video player with respect to its display position. For example, the measurement component may be injected (e.g., written or stored) at a place in the DOM tree of the publisher webpage (e.g., and XML or HTML document) in close relationship to the container that holds the video player in terms of distance when rendered and displayed on a device. In various embodiments, the measurement component may be a set of processor-executable instructions, a set of interpretable instructions, or the like that performs the measurement functions and operations described herein. In various embodiments, the measurement component may be measurement code, visibility code or the like that executes on computing device, such as device 500, 510, 520, or 710.

In some embodiments, after being injected into the web page, the measurement component may be initialized, which may include sending a message indicating that it has successfully loaded and is executing. In various embodiments, the injected measurement component must be successfully injected and initialized before the video ad content playback starts, because the initialization takes time that must be accounted for before visibility measurement begins.

If the injection fails (e.g., when the video player is running on a web page that does not permit JavaScript access and the measurement component is implemented in JavaScript), then there will be no "load successful" message and the initialization component may report to a remote measurement server that the injection failed.

At stage 1870, process 1800 determines whether a tracking event has been detected in the playing, or initializing, video advertisement. If a tracking event is not detected (stage 1870, No), then process 1800 loops and continues attempting to detect a tracking event.

If, on the other hand, a tracking event is detected (stage 1870, Yes), then process 1800 proceeds to stage 1880. In various embodiments, the tracking events (e.g., an indicator of the start of playback of the video ad content) are defined in the received file describing the video ad, and the video player detects the occurrence of these events during initialization and/or playback. As described previously, when a tracking event occurs, the video player may make a request to a tracking URI associated with the event. In the case where a measurement flag is included in the video ad file (as illustrated in the example of process 1800, stage 1840, Yes), instead of making the request to the tracking URI, the video player may instead communicate the occurrence of the event to the initialization component, including, in some embodiments, passing the tracking URI to the initialization component.

In the implementation shown in FIG. 18, at stage 1880, process 1800 causes the measurement component to make a visibility measurement associated with the detected tracking event. In various embodiments, this stage may be implemented by the initialization component communicating the detected tracking event to the measurement component (e.g., the injected JavaScript running on the web page), where this communication may trigger the measurement component to take action. In various embodiments, the communication may contain parameters, attributes or other information describing the current status of the playing video ad to the measurement component—e.g., information indicating that the video ad content playback is starting, is at a specific point in time from the beginning, is ended, is in a pause state, has been stopped, etc.

At stage 1890, process 1800 measures the visibility of the video advertisement, in accordance with the tracking event. In some implementations, process 1800 may vary how the visibility is measured according to the information describing the current status of the playing video ad. In various implementations of this stage, the measurement component performs the appropriate visibility measurements, after which process 1800 loops back to detect further tracking events at stage 1870. In general, the measurement component measures whether the video ad content was visible during playback, for example, by measuring whether the video player 1512 was visible at the time the tracking events occurred, for example, using the techniques and methods described in the previous sections of this disclosure.

In various embodiments, the measurement component may measure visibility and duration of the video ad content. In various embodiments, the measurement component may measure an aggregate duration; for example, it may measure the aggregate time that the video ad was more than 50% in view on the device screen. In some embodiments, the measurement component may measure several visibility durations, e.g.: 1) total time the video ad was in view; 2) total time the video ad was in view more than 50%; 3) total time the video ad was 100% in view, etc. In various embodiments, the measurement component may calculate these three durations at the occurrence of every tracking event. In some embodiments, this calculation may include extrapolations of visibility during the time intervals between measurement events. For example, if the measurement component determines that the video ad content was 100% visible at time N and then later determines that the video ad content was 100% visible at time N+7.5 seconds, then the measurement component may extrapolate the video ad content was also 100% visible during the 7.5 second interval between time N and time N+7.5.

One of ordinary skill will recognize that the stages, operations, components, layout and implementation details of the illustrated process 1800 are simplified examples presented for conciseness and clarity of explanation. Other stages, operations, components, layouts, implementation details and variations may be used without departing from the principles of this disclosure. For example, the description above with respect to FIG. 18 is but one implementation consistent with the invention. Another way to implement or embody the disclosed functionality is within the video ad itself. Such embodiments may be appropriate where the video ad is an executable video—e.g., an interactive video or rich-media video. For example, Flash™ videos are executables, and the functionality described may be included in the video file, where it will be executed by the Flash™ video player. For example, executable initialization code may be wrapped around (or, alternatively, included within) a video ad, such that when the video ad is played in a Flash™ player, the initialization wrapper code will perform functions as described above, such as inject a measurement component into the web page in proximity to the player, measure the visibility of the player at specified tracking events (e.g., start, midpoint, end or other fee-paid events), etc., as described above. In other embodiments the measurement component and the initialization component may both be incorporated directly within the video ad file. The tracking events may be detected by the initialization wrapper code, and an advertiser may specify events as desired to be built into the wrapper code. In such embodiments, there is no video ad file to be parsed.

Other variations include systems and methods that perform operations including: receiving a file describing a video ad; determining whether the file contains a specified flag; if the file contains the specified flag, then executing an initialization component associated with a video player; receiving a measurement component; incorporating the measurement component within a web page containing the video player; determining whether a tracking event occurred; if the tracking event occurred, then communicating the tracking event from the initialization component to the measurement component; and performing, by the measurement component, visibility measurements as appropriate.

Still other variations include systems and methods for measuring visibility information associated with video content played by a video player incorporated into a webpage that perform operations including: receiving metadata information associated with the video content; determining whether the metadata information contains a measurement flag; if the metadata information contains a measurement flag, executing an initialization component associated with the video player; initializing, by the initialization component, a measurement component associated with the video player; and measuring, by the measurement component, visibility information associated with the video content played by the video player. In some such variations, the metadata information contains event callback instructions associated with the video content; the video player executes event callback instructions when events occur in relation to the video content; determining whether the metadata information contains a measurement flag includes determining whether at least one of the event call back instructions includes a measurement flag; and measuring, by the measurement component, visibility information associated with the video content played by the video player includes measuring visibility information associated with the video content when an event callback instruction including a measurement flag is executed. In some implementations, the initialization component is incorporated into the video player and wherein the measurement component is incorporated into the web page.

Still other variations include systems and methods for measuring the visibility of video that perform operations including: placing a player measurement component in the code of an executable video ad; playing, by a video player, the executable video ad; receiving, by the player measurement component, a web page visibility measurement component; injecting the web page visibility measurement component onto a web page containing the video player; determining whether a tracking event occurred during the playing; if the tracking event occurred, then communicating the tracking event from the player measurement component to the web page visibility measurement component; and performing, by the web page visibility measurement component, visibility measurements appropriate for the tracking event, in response to the communicating.

The disclosed embodiments are also not limited to advertisements and video advertisements, but may be used in any situation in which it is desirable to determine the visibility of content on a device screen, including static content such as an image and including content that changes over time such as, for example, a slide show, an animated image or an animated vector object, whether in connection with a mobile application, a web browser, or a different application that is running locally on a client device. Moreover, the disclosed embodiments are also not limited to measuring visibility information, but may be used to measure any information regarding video content, such as, for example, user interaction information (e.g., mouse clicks, start, pause, stop, fast forward, slow play, fast play, sound mute, etc.). Moreover, although some embodiments are described in the context of HTTP communications, the invention is not limited to any particular open systems interconnection (OSI) layer; rather, any suitable application, presentation, session transport, network, data link, or physical protocol may be used, whether as part of the OSI model or as a standalone protocol.

The foregoing description of the invention, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the invention. For example, although screen-draw-counts have been described primarily with respect to images, information regarding other types of webpage elements, such as text, "div" or "span" elements, IFrames, etc., may also be measured to determine visibility if a browser exposes similar screen-draw-count properties for such elements.

Likewise, the steps and stages described need not be performed in the same sequence discussed or with the same degree of separation. Various steps and stages may be omitted, repeated, combined, or divided, as necessary to achieve the same or similar objectives or enhancements. Accordingly, the invention is not limited to the above-described embodiments, but instead is defined by the appended claims in light of their full scope of equivalents.

Certain embodiments can be implemented as or using a computer program or set of programs. The computer programs can exist in a variety of forms both active and inactive. For example, the computer programs can exist as software program(s) comprised of program instructions in source code, object code, scripts, executable code or other formats, firmware program(s), or hardware description language (HDL) files. Any of the above can be embodied on a non-transitory computer-readable medium, which include storage devices or can embodied in signals, in compressed or uncompressed form. Exemplary computer-readable storage devices include conventional computer system RAM (random access memory), ROM (read-only memory), EPROM (erasable, programmable ROM), EEPROM (electrically erasable, programmable ROM), and magnetic or optical disks or tapes.

Certain embodiments can utilize or include a computer system, which may include one or more processors coupled to random access memory operating under control of or in conjunction with an operating system, for example as described with respect to FIG. 5. The processors may be included in one or more servers, clusters, or other computers or hardware resources, or may be implemented using cloud-based resources. The processors may communicate with persistent memory, which may include a hard drive or drive array, to access or store program instructions or other data. The processors may be programmed or configured to execute computer-implemented instructions to perform the techniques disclosed herein.

In the claims, unless otherwise specified, when a claim recites transmitting, downloading, or receiving "instructions" for performing certain operations, the term "instructions" comprises any set of computer instructions—interpretable, executable, or otherwise—capable of causing a device that receives the instructions, or a device to which the instructions will subsequently be transmitted, to perform the recited operations, even if the received instructions rely on certain methods, functions, libraries, or features provided by the device or software resident on the device that are not themselves part of the received set of instructions. Also, in the claims, unless otherwise specified, terms differentiated by ordinals such as "first," "second," "third," etc., may refer to the same or different devices or objects.

What is claimed is:

1. A method, implemented using a client computing device for measuring visibility of video of a web page downloaded from a web server via a communication network and displayed by a video player in a web browser application executing on the client computing device, wherein the method causes the client computing device to perform operations comprising:
   receiving, by the client computing device, the video from the web server via the communication network;
   enabling a measurement component in the web page, the measurement component comprising program code that renders one or more images proximal to a display position of the video player in the web page and performs visibility measurements based on one or more images rendered proximal to a display position of the video player in the web page;

playing the video using the video player;

detecting, by the client computing device, a first tracking event of one or more tracking events during playing of the video by the video player;

determining, by the client computing device, a visibility measurement associated with the first tracking event using the measurement component, the visibility measurement indicating whether at least a portion of the video is visible on a display of the computing device based on the one or more images rendered proximal to the display position of the video player;

generating, by the client computing device, visibility information that represents whether at least a portion of the video is visible on the display according to the determining; and transmitting, by the client computing device, via the communication network, the visibility information to a remote server.

2. The method of claim 1, wherein the operations further comprise obtaining the measurement component via the communication network.

3. The method of claim 2, wherein the operations further comprise downloading measurement code from a remote computer.

4. The method of claim 1, further comprises:

modifying a document object module (DOM) representing the webpage to include the measurement component.

5. The method of claim 1, wherein:

the one or more tracking events comprises an occurrence related to playing of the video by the video player; and determining a visibility measurement comprises measuring, in response to the occurrence related to playing of the video, the visibility of at least a portion of the video player that is playing the video on the computing device.

6. The method of claim 1, wherein the tracking event indicates one of the following:

playback of this video is started, playback of this video is at a specific point in time from a beginning of the video, playback of this video is ended, playback of this video is paused, and playback of this video is stopped.

7. A system for measuring visibility of video of a web page downloaded from a web server via a communication network and displayed by a video player in a web browser application on a client computing device, the system comprising:

a memory containing instructions; and a processor, operably connected to the memory, that executes the instructions that control the client computing device to perform operations comprising:

receiving, by the client computing device, the video from the web server via the communication network;

enabling a measurement component in the web page, the measurement component comprising program code that renders one or more images proximal to a display position of the video player in the web page and performs visibility measurements based on one or more images rendered proximal to a display position of the video player in the web page;

playing the video using the video player;

detecting a first tracking event of one or more tracking events during playing of the video by the video player;

determining a visibility measurement associated with the first tracking event using the measurement component, the visibility measurement indicating whether at least a portion of the video is visible on a display of the computing device based on the one or more images rendered proximal to the display position of the video player;

generating visibility information that represents whether at least a portion of the video is visible on the display according to the determining; and transmitting, by the client computing device, via the communication network, the visibility information to a remote server.

8. The system of claim 7, wherein the operations further comprise obtaining the measurement component via the communication network.

9. The system of claim 8, wherein the operations further comprise downloading measurement code from a remote computer.

10. The system of claim 7, further comprise:

modifying a document object module (DOM) representing the webpage to include the measurement component.

11. The system of claim 7, wherein:

the one or more tracking events comprises an occurrence related to playing of the video by the video player; and determining a visibility measurement comprises measuring, in response to the occurrence related to playing of the video, the visibility of at least a portion of a video player that is playing the video on the computing device.

12. The system of claim 7, wherein the tracking event indicates one of the following:

playback of this video is started, playback of this video is at a specific point in time from a beginning of the video, playback of this video is ended, playback of this video is paused, and playback of this video is stopped.

13. A method, implemented using a client computing device, for measuring the visibility of a video ad of a web page downloaded from a web server via a communication network and displayed by a video player in a web browser application executing on the client computing device, wherein the method causes the client computing device to perform operations comprising:

receiving, by the client computing device, the video ad from the web server via the communication network;

rendering, by the client computing device, the web page that includes the video player;

receiving, by the client computing device, a file describing the video ad via the communication network;

determining, by the client computing device, that the file contains a measurement indicator;

executing, by the client computing device, an initialization component associated with the video player based on the determining;

receiving, by the client computing device, a measurement component via the communication network, the measurement component comprising program code that measures the visibility of the video player in the web page;

incorporating the measurement component within the web page that includes the video player;

playing the video ad using the video player;

determining, by the client computing device, that a tracking event occurred when playing the video ad;

communicating, by the client computing device, the tracking event that occurred from the initialization component to the measurement component;

determining, by the measurement component, whether at least a portion of the video ad is visible on a display;

generating, by the client computing device, visibility information that represents whether at least a portion of the video ad was visible on the display;

transmitting, by the client computing device, via the communication network, the visibility information to a remote server; and presenting the visibility information.

14. The method of claim 13, wherein:

the file comprises metadata defining the tracking event;

the tracking event comprises an occurrence related to playing of the video by the video player; and determining whether at least a portion of the video ad is visible on the display comprises measuring, in response to the occurrence related to playing of the video, the visibility of at least a portion of the video player that is playing the video ad.

15. The method of claim 13, wherein the tracking event indicates one of the following:

playback of this video ad is started, playback of this video ad is at a specific point in time from a beginning of the video, playback of this video ad is ended, playback of this video ad is paused, and playback of this video ad is stopped.

* * * * *